US011841741B2

(12) United States Patent
Levine

(10) Patent No.: US 11,841,741 B2
(45) Date of Patent: Dec. 12, 2023

(54) COMPOSITE POSE ESTIMATE FOR WEARABLE COMPUTING DEVICE

(71) Applicant: Microsoft Technology Licensing, LLC, Redmond, WA (US)

(72) Inventor: Evan Gregory Levine, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 287 days.

(21) Appl. No.: 17/244,798

(22) Filed: Apr. 29, 2021

(65) Prior Publication Data

US 2022/0350365 A1    Nov. 3, 2022

(51) Int. Cl.
*G06F 1/16*      (2006.01)
*G06N 20/00*    (2019.01)
*G01P 3/00*     (2006.01)

(52) U.S. Cl.
CPC ............. *G06F 1/163* (2013.01); *G01P 3/00* (2013.01); *G06N 20/00* (2019.01)

(58) Field of Classification Search
CPC ............ G06F 1/163; G06N 20/00; G01P 3/00
USPC ........................................................ 702/150
See application file for complete search history.

(56) References Cited

U.S. PATENT DOCUMENTS

2017/0018121 A1\*   1/2017   Lawson ................. G06V 40/10
2018/0087903 A1\*   3/2018   Werner ............... G01C 21/1656
2021/0254979 A1\*   8/2021   Faragher ................ G01S 19/35

FOREIGN PATENT DOCUMENTS

CN       112648994 A     4/2021
WO     2020074921 A1    4/2020

OTHER PUBLICATIONS

"International Search Report and Written Opinion Issued in PCT Application No. PCT/US22/023403", dated Jul. 14, 2022, 14 Pages.
Bai, et al., "An Empirical Evaluation of Generic Convolutional and Recurrent Networks for Sequence Modeling", In Repository of arXiv:1803.01271v2, Apr. 19, 2018, 14 Pages.

\* cited by examiner

*Primary Examiner* — Aditya S Bhat
(74) *Attorney, Agent, or Firm* — Alleman Hall Creasman & Tuttle LLP

(57) ABSTRACT

A wearable computing device, including a device body, an inertial measurement unit (IMU), and a processor. The processor may receive, from the IMU, a plurality of kinematic measurements collected within a time window. With one or more machine learning models, based at least in part on the kinematic measurements, the processor may compute a current velocity estimate for the wearable computing device at a current timestep and a prior velocity estimate for the wearable computing device at a prior timestep. The processor may compute a current pose estimate and a prior pose estimate based at least in part on the current velocity estimate and the prior velocity estimate, respectively. The processor may compute a composite pose estimate for the wearable computing device at the current timestep based on the current pose estimate and the prior pose estimate. The processor may output the composite pose estimate to a target program.

20 Claims, 15 Drawing Sheets

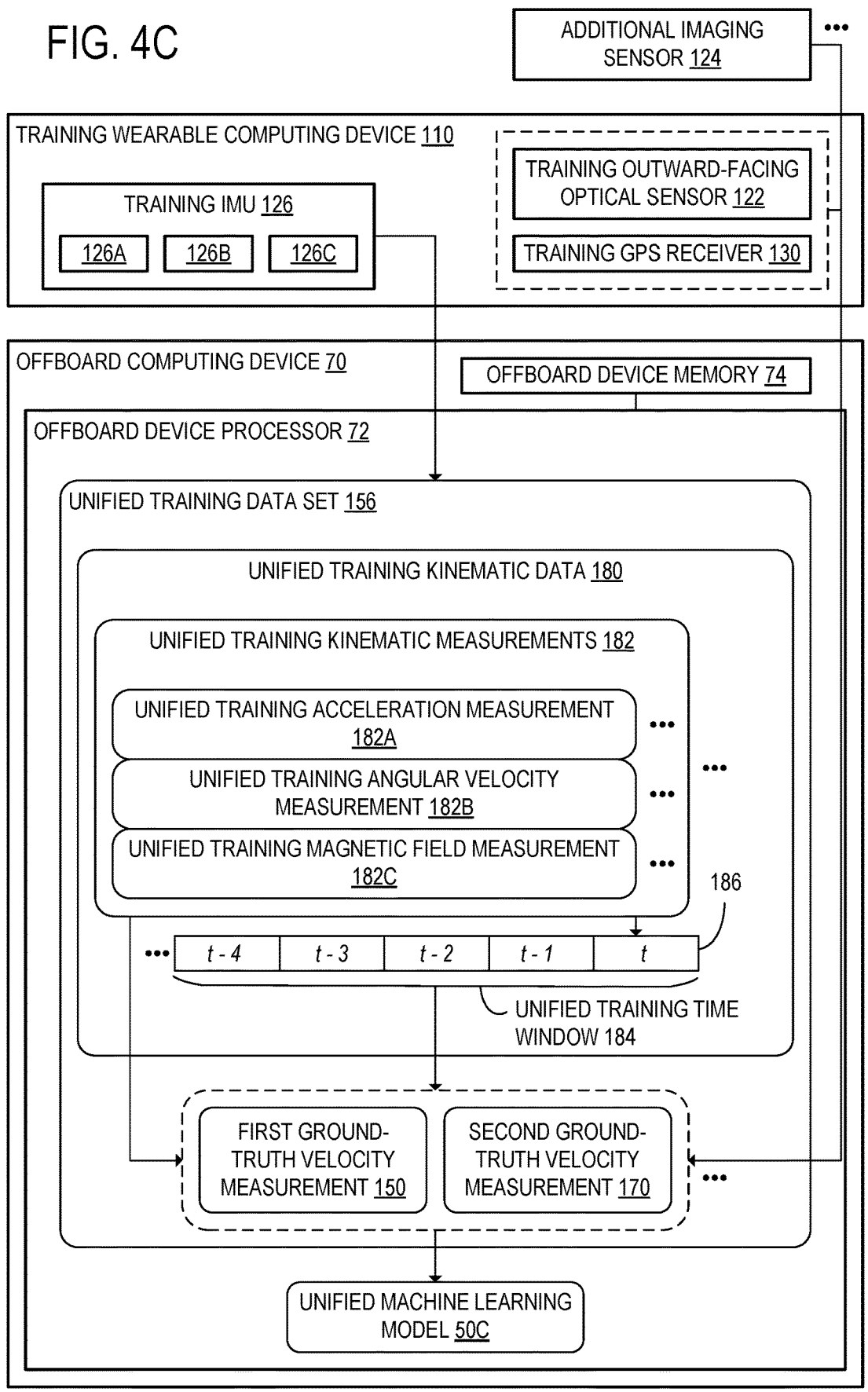

COMPOSITE POSE ESTIMATE FOR WEARABLE COMPUTING DEVICE

BACKGROUND

When a wearable computing device is in use, it is frequently useful to estimate the position and angular orientation of the wearable computing device in space. The position and angular orientation of the wearable computing device are referred to as the pose of the device. For example, when the wearable computing device includes a display, the wearable computing device may utilize pose data to determine the positions of content items that are displayed to the user. As another example, the wearable computing device may use the position and angular orientation of the device as inputs for a navigation program.

SUMMARY

According to one aspect of the present disclosure, a wearable computing device is provided, including a device body configured to be mounted on a body of a user, an inertial measurement unit (IMU), and a processor. The processor may be configured to receive, from the IMU, a plurality of kinematic measurements collected within a time window. With one or more machine learning models, based at least in part on the plurality of kinematic measurements, the processor may be further configured to compute a current velocity estimate for the wearable computing device at a current timestep within the time window, and based at least in part on the plurality of kinematic measurements, compute a prior velocity estimate for the wearable computing device at a prior timestep that is prior to the current timestep within the time window. The processor may be further configured to compute a current pose estimate for the wearable computing device at the current timestep and a prior pose estimate for the wearable computing device at the prior timestep based at least in part on the current velocity estimate and the prior velocity estimate, respectively. The processor may be further configured to compute a composite pose estimate for the wearable computing device at the current timestep based at least in part on the current pose estimate and the prior pose estimate. The processor may be further configured to output the composite pose estimate to a target program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4C schematically shows a training wearable computing device and an offboard computing device during training of the unified machine learning model of FIG. 2B.

DETAILED DESCRIPTION

Pose estimation for wearable computing devices is frequently performed using Global Positioning System (GPS) data for the wearable computing device. Imaging data of the environment surrounding the wearable computing device may additionally or alternatively be used to perform pose estimation. However, accurate GPS data and imaging data may be unavailable in some scenarios in which a wearable computing device is used. In such scenarios, an inertial measurement unit (IMU) included in the wearable computing device may be used to perform inertial odometry (also referred to as dead reckoning) for the wearable computing device. When inertial odometry is performed, a processor included in the wearable computing device may estimate the pose of the device based on measurements received from the IMU. The measurements received from the IMU may include data collected during a time window that is divided into a plurality of timesteps. The time window may include a current timestep and a plurality of prior timesteps.

In existing methods of inertial odometry for wearable computing devices, there is a tradeoff between accuracy and latency of the pose estimate. When the pose estimate is computed for the current timestep, the processor may achieve a low latency between the timestep for which the pose estimate is computed and the time at which the processor outputs the pose estimate. However, the accuracy of the pose estimate may be low. When the pose estimate is instead computed for a timestep that occurs earlier in the time window than the current timestep, the processor may interpolate between IMU data collected at timesteps before and after the timestep for which the pose estimate is computed. Thus, the pose estimate may be computed more accurately but with a longer delay compared to computing the pose estimate for the current timestep.

Figure 1A:
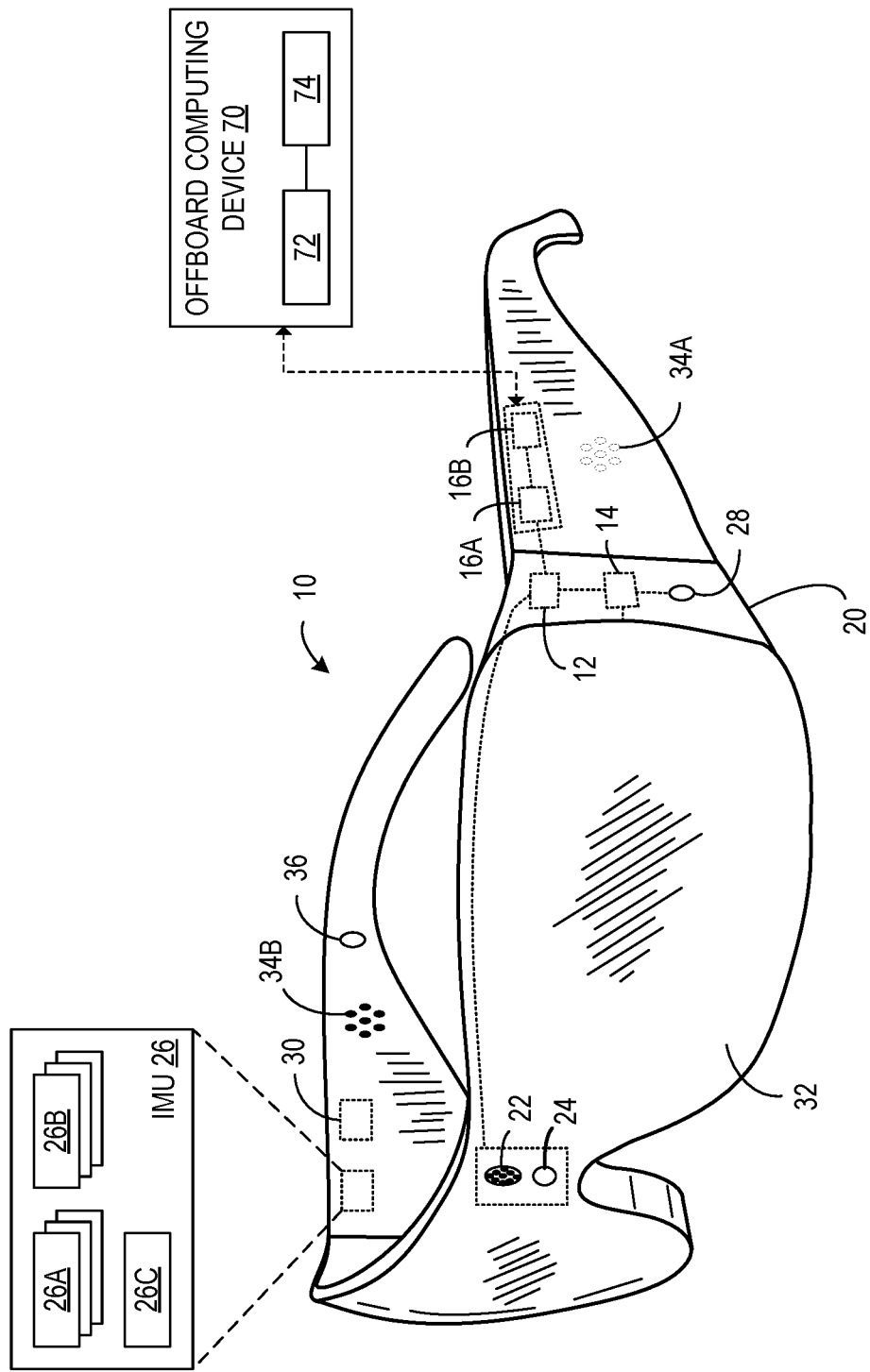
FIG. 1A shows an example wearable computing device in the form of a head-mounted computing device, according to one example embodiment.
Figure 1B:
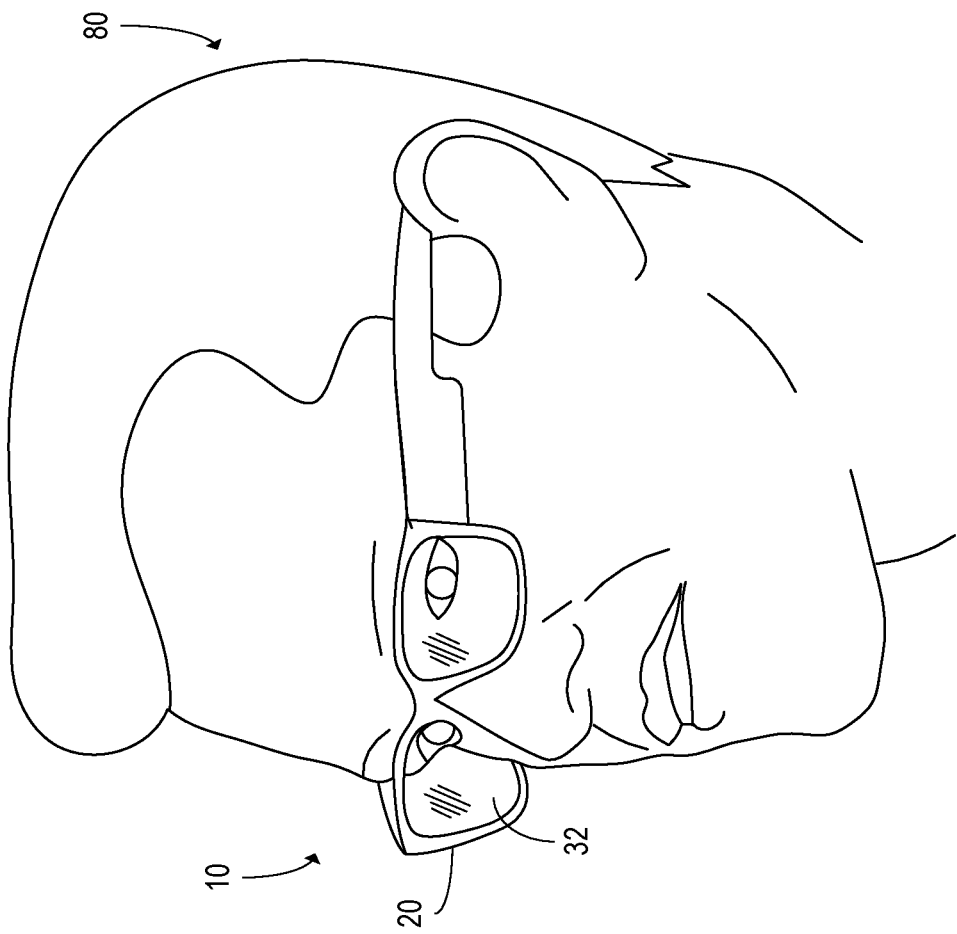
FIG. 1B shows the example wearable computing device of FIG. 1A when the wearable computing device is worn by a user.
Figure 1B:
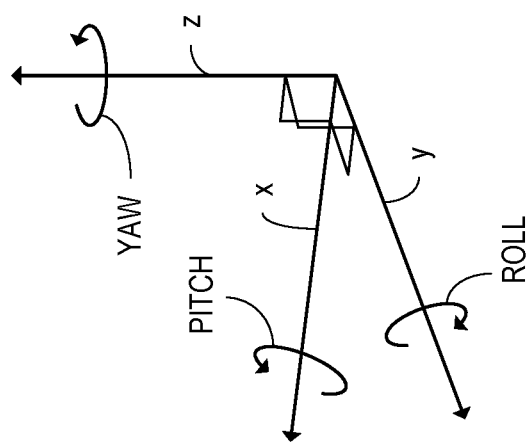

In order to address the challenges discussed above, a wearable computing device 10 is provided, as shown in the example of FIG. 1A. In the example of FIG. 1A, the wearable computing device 10 is a head-mounted display (HMD) device configured to present a mixed-reality environment. The wearable computing device 10 may include a device body 20 configured to be mounted on a body of a user 80, as shown in the example of FIG. 1B. As shown in the example of FIG. 1B, the device body 20 may be a frame that holds a display 32, which takes the form of a near-eye display in this example, close to the user's eyes. Returning to FIG. 1A, the device body 20 may support additional components of the wearable computing device 10, such as, for example, a processor 12 and memory 14. The processor 12 may be operatively coupled to the memory 14 and may be configured to provide image signals to the display 32, to receive sensor data from input devices, and to enact various control processes.

In some examples, the wearable computing device 10 may further include a communication device suite, which may include a receiver 16A and a transmitter 16B. The receiver 16A and the transmitter 16B may be respectively configured to receive and transmit wireless communication signals. Via the receiver 16A and the transmitter 16B, respectively, the processor 12 may be configured to receive data from, and transmit data to, an offboard computing device 70. The offboard computing device 70 may include an offboard device processor 72 that is communicatively coupled to offboard device memory 74. The offboard computing device 70 may, for example, be configured to perform computations on the data received from the wearable computing device 10 and to transmit the results of those computations to the wearable computing device 10. Thus, computationally expensive tasks may be offloaded to the offboard computing device 70 by the processor 12. In another example, the wearable computing device 10 may be networked with one or more other wearable computing devices via the receiver 16A and the transmitter 16B.

The display 32 may be configured to enable the user 80 of the wearable computing device 10 to view physical, real-world objects in the physical environment through one or more partially transparent pixels displaying virtual object representations. Thus, the physical objects and the virtual object representations may both be included in a mixed-reality environment. The display 32 may include image-producing elements such as, for example, a see-through Organic Light-Emitting Diode (OLED) display. As another example, the wearable computing device 10 may include a light modulator on an edge of the display 32. In this example, the display 32 may serve as a light guide for delivering light from the light modulator to the eyes of the user 80. In other examples, the display 32 may utilize a liquid crystal on silicon (LCOS) display.

In addition to the display 32, the wearable computing device 10 may further include one or more output devices. In the example of FIG. 1A, the wearable computing device 10 includes a left speaker 34A and a right speaker 34B configured to output sound. The left speaker 34A and the right speaker 34B may be positioned to be near the user's left ear and right ear respectively when worn. Thus, the wearable computing device 10 may be configured to produce stereo sound outputs via the left speaker 34A and the right speaker 34B. The wearable computing device 10 may further include one or more haptic feedback devices 36 configured to produce touch output (e.g. vibration).

The wearable computing device 10 shown in FIG. 1A further includes a plurality of input devices, including various sensors and related systems to provide information to the processor 12. Such sensors may include an IMU 26 and a GPS receiver 30, as discussed in further detail below. The plurality of input devices may further include one or more imaging sensors, which may include one or more outward-facing imaging sensors 22 and one or more inward-facing imaging sensors 24. The one or more inward-facing imaging sensors 24 may be configured to acquire image data in the form of gaze tracking data from a wearer's eyes. The one or more outward-facing imaging sensors 22 may be configured to capture and/or measure physical environment attributes of the physical environment in which the wearable computing device 10 is located. In one example, the one or more outward-facing imaging sensors 22 may include a visible-light camera or RGB camera configured to collect a visible-light image of a physical space. Further, the one or more outward-facing imaging sensors 22 may include a depth camera configured to collect a depth image of a physical space. The depth camera may, for example, be an infrared time-of-flight depth camera. In another example, the depth camera may be an infrared structured light depth camera.

Data from outward-facing imaging sensors 22 may be used by the processor 12 to generate and/or update a three-dimensional (3D) model of the physical environment. The data from the outward-facing imaging sensors 22 may be used by the processor 12 to identify surfaces of the physical environment and/or measure one or more surface parameters of the physical environment. The processor 12 may be configured to execute instructions to generate or update virtual scenes displayed on display 32, identify surfaces of the physical environment, and recognize objects based on the identified surfaces in the physical environment. The position and orientation of the wearable computing device 10 relative to the physical environment may, for example, be assessed so that augmented-reality images may be accurately displayed in desired real-world locations with desired orientations. The 3D model of the physical environment may include surface reconstruction information, which may include a geometric representation, such as a geometric mesh, of the physical environment.

The GPS receiver 30 included in the wearable computing device 10 may be configured to receive global positioning signals that indicate the position of the wearable computing device 10. For example, a global positioning signal may indicate a latitude and a longitude at which the wearable computing device 10 is located. The global positioning signals may, for example, be received from a GPS satellite.

The IMU 26 of the wearable computing device 10 may be configured to provide position and/or orientation data of the wearable computing device 10 to the processor 12. In one implementation, the IMU 26 may be configured as a sixdegree of freedom (6DOF) position sensor system. Such a configuration may include three accelerometers 26A and three gyroscopes 26B to indicate or measure a change in location of the wearable computing device 10 along three orthogonal spatial axes (e.g., x, y, and z) and a change in device orientation about three orthogonal rotation axes (e.g., yaw, pitch, and roll). Coordinate axes indicating the x, y, z, yaw, pitch, and roll directions in the reference frame of the user 80 are shown in FIG. 1B. In some examples, the IMU 26 may further include one or more magnetometers 26C configured to measure a strength and direction of a magnetic field. The orientation derived from the sensor signals of the IMU 26 may be used to display, via the display 32, one or more holographic images with a realistic and stable position and orientation.

Figure 2A:
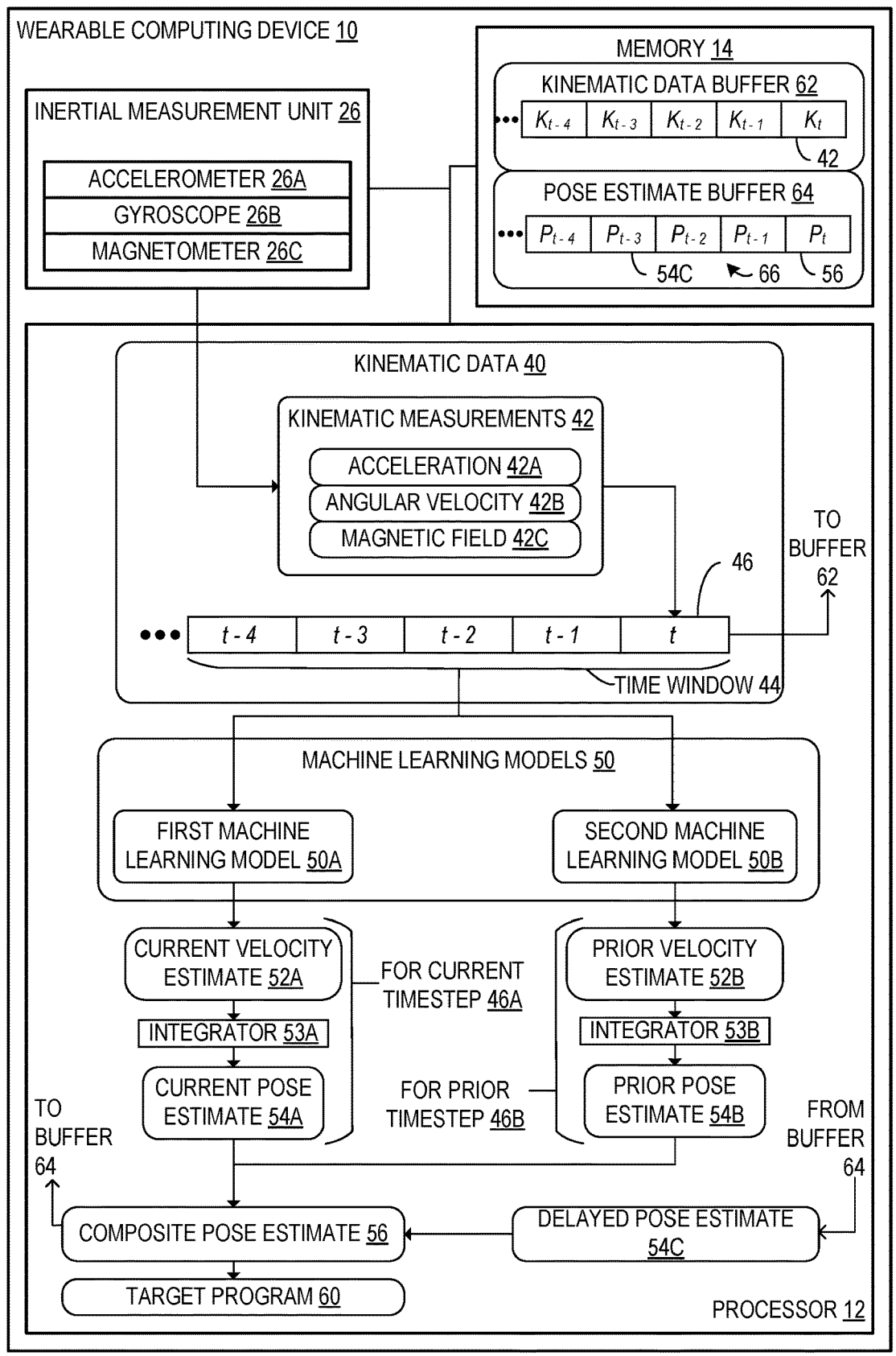
FIG. 2A schematically shows the example wearable computing device when a processor of the wearable computing device computes a current velocity estimate and a prior velocity estimate at a first machine learning model and a second machine learning model, respectively, according to the example of FIG. 1A.

FIG. 2A schematically depicts the wearable computing device 10 when inertial odometry is performed. When inertial odometry is performed at the wearable computing device 10, the processor 12 may be configured to receive, from the IMU 26, kinematic data 40 including a plurality of kinematic measurements 42 collected within a time window 44. Each of the kinematic measurements 42 may include one or more sensor data values associated with a corresponding timestep 46 of the time window 44. For example, each kinematic measurement 42 included in the kinematic data 40 may include one or more acceleration measurements 42A, one or more angular velocity measurements 42B, and/or one or more magnetic field measurements 42C. For example, the one or more acceleration measurements 42A, the one or more angular velocity measurements 42B, and the one or more magnetic field measurements 42C may be received from the one or more accelerometers 26A, the one or more gyroscopes 26B, and the one or more magnetometers 26C, respectively. Each of the sensor data values included in a kinematic measurement 42 may be received at each timestep 46 of the time window 44. Alternatively, two or more of the measured quantities included in the kinematic data 40 may be received at different subsets of the plurality of timesteps 46 included in the time window 44. The processor 12 may be configured to store, in the memory 14, a kinematic data buffer 62 including each of the kinematic measurements 42 for the time window 44.

One or more machine learning models 50 may be implemented at the processor 12 to compute velocity estimates for the wearable computing device 10. With the one or more machine learning models 50, the processor 12 may be configured to compute a current velocity estimate 52A for the wearable computing device 10 at a current timestep 46A within the time window 44. In addition, with the one or more machine learning models 50, the processor 12 may be further configured to compute a prior velocity estimate 52B for the wearable computing device 10 at a prior timestep 46B that is prior to the current timestep 46A within the time window 44. The current velocity estimate 52A may be an estimate of a linear velocity and an angular velocity of the wearable computing device 10 at the current timestep 46A, and the prior velocity estimate 52B may be an estimate of the linear velocity and the angular velocity of the wearable computing device 10 at the prior timestep 46B. The current velocity estimate 52A and the prior velocity estimate 52B may be computed based at least in part on the plurality of kinematic measurements 42, which may be used as inputs for inferencing with the one or more machine learning models 50.

In the example of FIG. 2A, the one or more machine learning models 50 include a first machine learning model 50A at which the current velocity estimate 52A is computed. The one or more machine learning models 50 in the example of FIG. 2A further include a second machine learning model 50B at which the prior velocity estimate 52B is computed. The first machine learning model 50A and the second machine learning model 50B may, for example, be a first temporal convolutional network (TCN) and a second TCN, respectively. In other examples, the first machine learning model 50A and/or the second machine learning model 50B may be some other type of machine learning model, such as a long short-term memory (LSTM) model or a gated recurrent unit (GRU) model.

In examples in which the one or more machine learning models 50 include a first machine learning model 50A and a second machine learning model 50B, as in the example of FIG. 2A, the first machine learning model 50A and the second machine learning model 50B may take, as inputs, sets of kinematic measurements 42 collected within different time windows 44. For example, the first machine learning model 50A may be configured to compute the current velocity estimate 52A based on kinematic measurements 42 received within the past two seconds, and the second machine learning model 50B may be configured to compute the prior velocity estimate 52B based on kinematic measurements 42 received within the past four seconds.

Figure 2B:
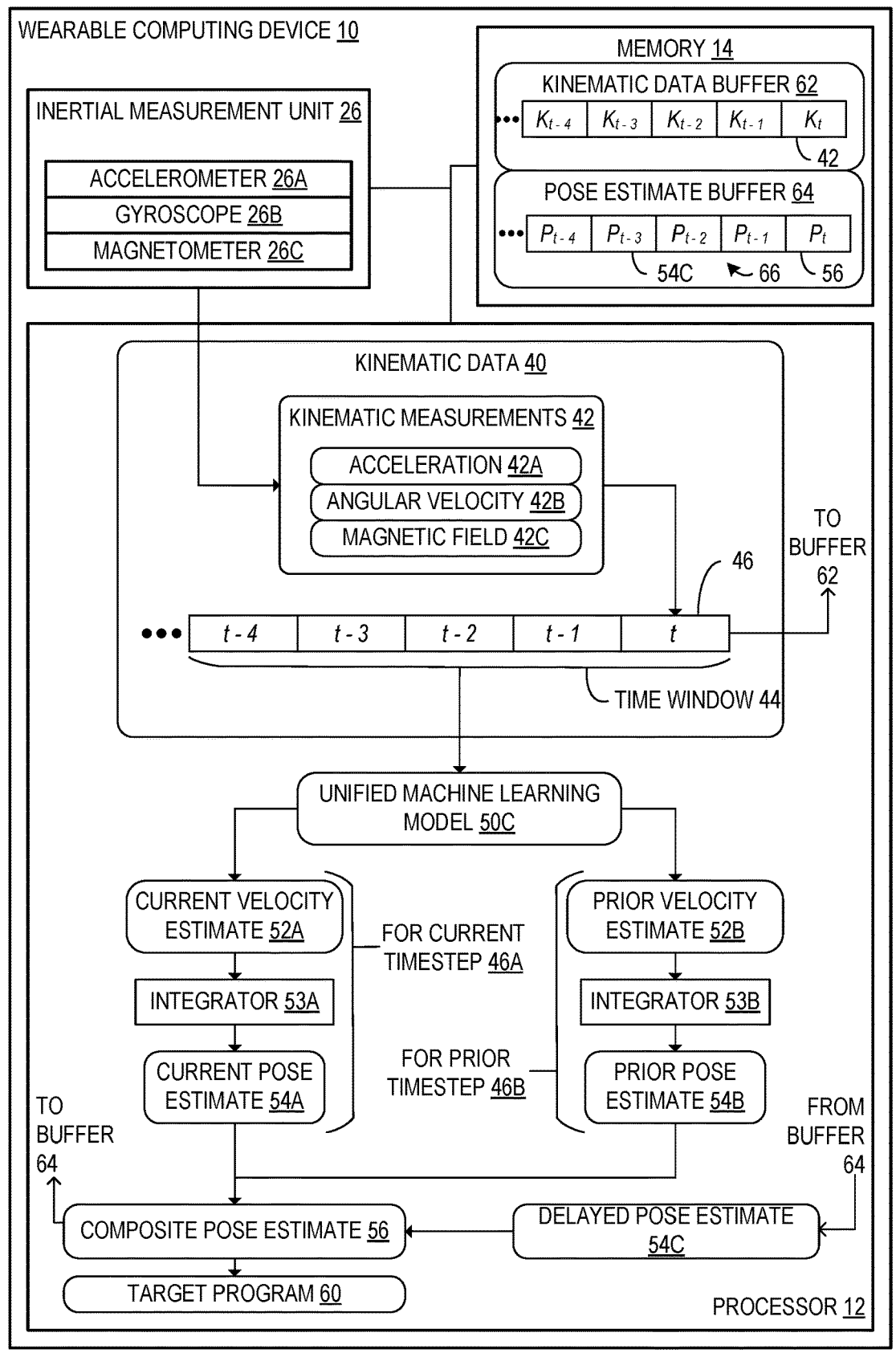
FIG. 2B schematically shows the example wearable computing device when the processor of the wearable computing device computes the current velocity estimate and the prior velocity estimate at a unified machine learning model, according to the example of FIG. 1A.

In other examples, as depicted in FIG. 2B, the one or more machine learning models 50 may include a unified machine learning model 50C that is configured to output both the current velocity estimate 52A and the prior velocity estimate 52B. Similarly to the first machine learning model 50A and the second machine learning model 50B shown in FIG. 2A, the unified machine learning model 50C may be a TCN. The process flow in FIG. 2B proceeds as in FIG. 2A except where the differences are noted.

Figure 3A:
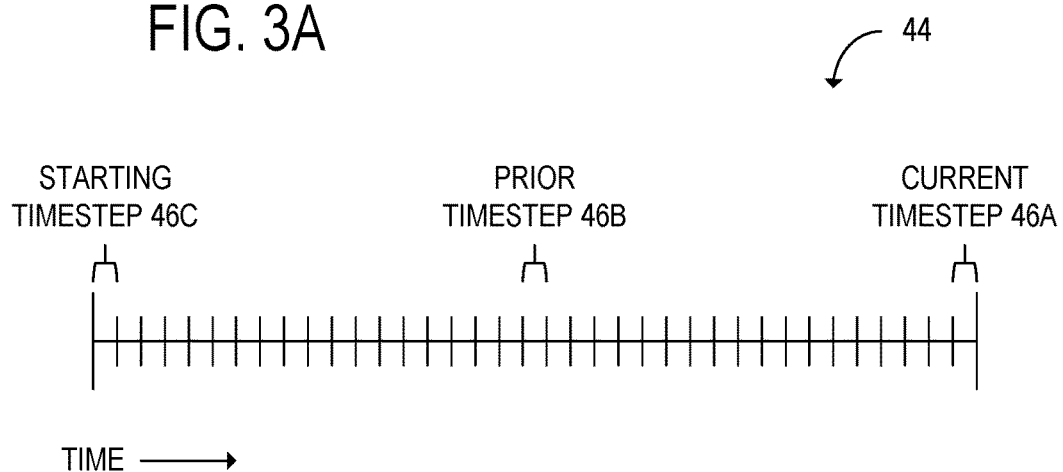
FIG. 3A schematically shows an example time window divided into a plurality of timesteps, according to the example of FIG. 1A.

FIG. 3A schematically shows an example time window 44 divided into a plurality of timesteps 46. The time window 44 may begin with a starting timestep 46C and may end with the current timestep 46A. In some examples, as shown in FIG. 3A, the prior timestep 46B may be located at a midpoint of the time window 44. In other examples, the prior timestep 46B may be located at some other point in the time window 44, such as one-third or two-thirds of the way through the time window 44.

Figure 3B:
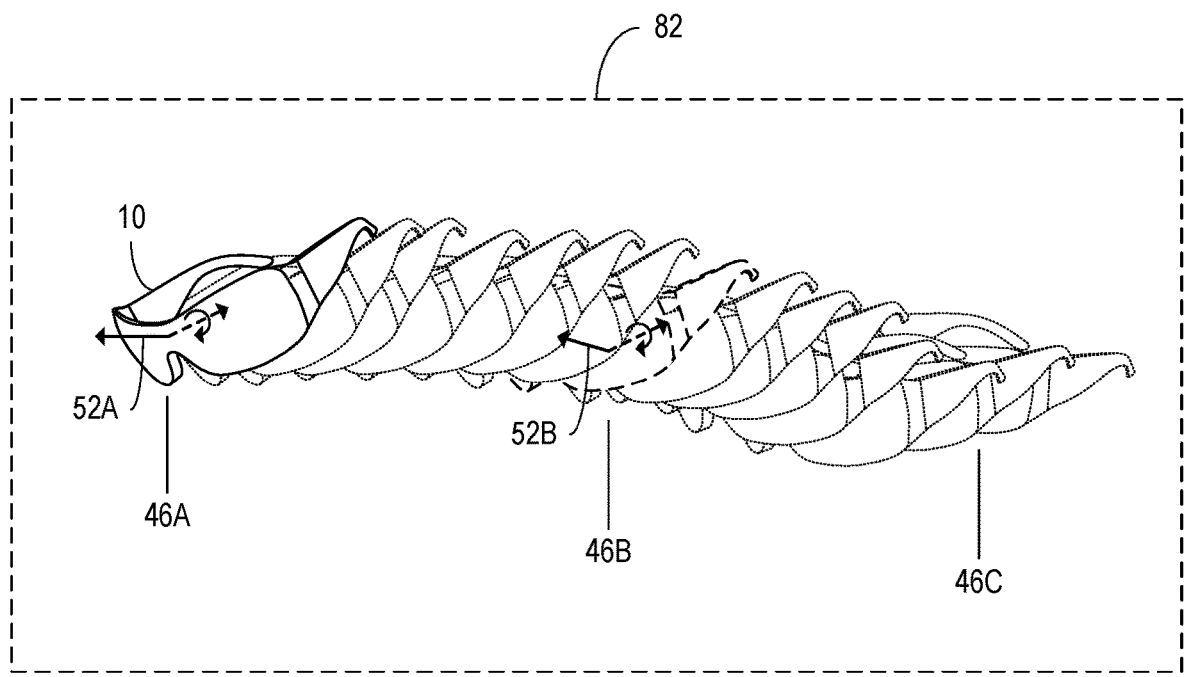
FIG. 3B shows an example trajectory of the wearable computing device moving through a physical environment during the example time window of FIG. 3A.

FIG. 3B shows an example trajectory of the wearable computing device 10 moving through a physical environment 82 during the time window 44. In the example of FIG. 3B, the current velocity estimate 52A and the prior velocity estimate 52B are represented as linear velocity vectors paired with respective rotational velocity vectors.

Returning to FIG. 2A, the processor 12 may be further configured to compute a current pose estimate 54A for the wearable computing device 10 at the current timestep 46A and a prior pose estimate 54B for the wearable computing device 10 at the prior timestep 46B based at least in part on the current velocity estimate 52A and the prior velocity estimate 52B, respectively. Processor 12 may be configured to process the current velocity estimate 52A via an integrator 53A to thereby compute the current pose estimate 54A. Likewise, processor 12 may be configured to process the prior velocity estimate 52B via an integrator 53B, to thereby compute the prior pose estimate 54B. The current pose estimate 54A and/or the prior pose estimate 54B may be stored in the memory 14 in a pose estimate buffer 64. Computing the current pose estimate 54A may include integrating the current velocity estimate 52A over the current timestep 46A. The result of this integration may be added to a previously computed pose estimate 66 retrieved from the pose buffer 64 to generate the current pose estimate 54A as an updated pose estimate. The previously computed pose estimate 66 used to generate the current pose estimate 54A may be a pose estimate corresponding to a timestep immediately prior to the current timestep 46A. Similarly, computing and the prior pose estimate 54B may include integrating the prior velocity estimate 52B over the prior timestep 46B. The result obtained from integrating the prior velocity estimate 52B may be added to a previously computed pose estimate 66 to generate the prior pose estimate 54B. The previously computed pose estimate 66 used to compute the prior pose estimate 54B may be a pose estimate corresponding to a timestep immediately prior to the prior timestep 46B.

The processor 12 may be further configured to compute a composite pose estimate 56 for the wearable computing device 10 at the current timestep 46A based at least in part on the current pose estimate 54A and the prior pose estimate 54B. The composite pose estimate 56 may be a current composite pose estimate that combines pose information included in the current pose estimate 54A and the prior pose estimate 54B, resulting in a pose estimate that has both high accuracy and low latency. In some examples, when computing the composite pose estimate 56, the processor 12 may be configured to retrieve, from the pose estimate buffer 64, a delayed pose estimate 54C for the wearable computing device 10 at the prior timestep 46B. The delayed pose estimate 54C may be a previously computed pose estimate 66 of the plurality of previously computed pose estimates 66 that was computed as a current pose estimate at the prior timestep 46B. Thus, current pose estimates 54A that are stored in the pose estimate buffer 64 may be used at later timesteps to compute delayed pose estimates 54C. In examples in which a delayed pose estimate 54C is retrieved from the pose estimate buffer 64, the processor 12 may be further configured to compute the composite pose estimate 56 based on the current pose estimate 54A, the prior pose estimate 54B, and the delayed pose estimate 54C.

In examples in which the composite pose estimate 56 is computed based on the current pose estimate 54A, the prior pose estimate 54B, and the delayed pose estimate 54C, the current pose estimate 54A and the prior pose estimate 54B may be computed as square matrices $T_{current}(t)$ and $T_{prior}(t-\Delta)$, where t is the time at the current timestep 46A and $\Delta$ is the time delay between the prior timestep 46B and the current timestep 46A. The delayed pose estimate 54C make take the form of a square matrix $T_{current}(t-\Delta)$. The processor 12 may be further configured to compute the composite pose estimate 56 as specified by the following equation:

$$T_{composite}(t) = T_{prior}(t-\Delta) T_{current}(t-\Delta)^{-1} T_{current}(t)$$

Thus, when the processor 12 computes the composite pose estimate 56, the processor 12 may perform a coordinate system transformation from a spatial coordinate system centered at the position indicated by the prior pose estimate 54B to a spatial coordinate system centered at the position indicated by the current pose estimate 54A. Computing the composite pose estimate 56 using the equation provided above may correct errors in the current pose estimate 54A using information from the prior pose estimate 54B, thereby resulting in higher accuracy.

Subsequently to computing the composite pose estimate 56, the processor 12 may be further configured to output the composite pose estimate 56 to a target program 60. For example, the composite pose estimate 56 may be output to a target program 60 at which the processor 12 is configured to generate one or more virtual images to display to the user 80 in a mixed-reality environment. In some examples, the processor 12 may be configured to output the composite pose estimate 56 to one or more offboard computing devices 70.

In some examples, the one or more machine learning models 50 may include three or more machine learning models 50. In such examples, a first machine learning model 50A may be configured to compute a current velocity estimate 52A. The other machine learning models 50 of the plurality of machine learning models 50 may be configured to compute respective prior velocity estimates 52B for different prior timesteps 46B. For example, when the one or more machine learning models 50 include three machine learning models 50, the processor 12 may be configured to compute a current velocity estimate 52A, a prior velocity estimate 52B for a timestep 46 one-third of the way through the time window 44, and a prior velocity estimate 52B for a timestep 46 two-thirds of the way through the time window 44. In other examples, the current timestep 46A and the prior timesteps 46B may be unevenly spaced in the time window 44.

Figure 4A:
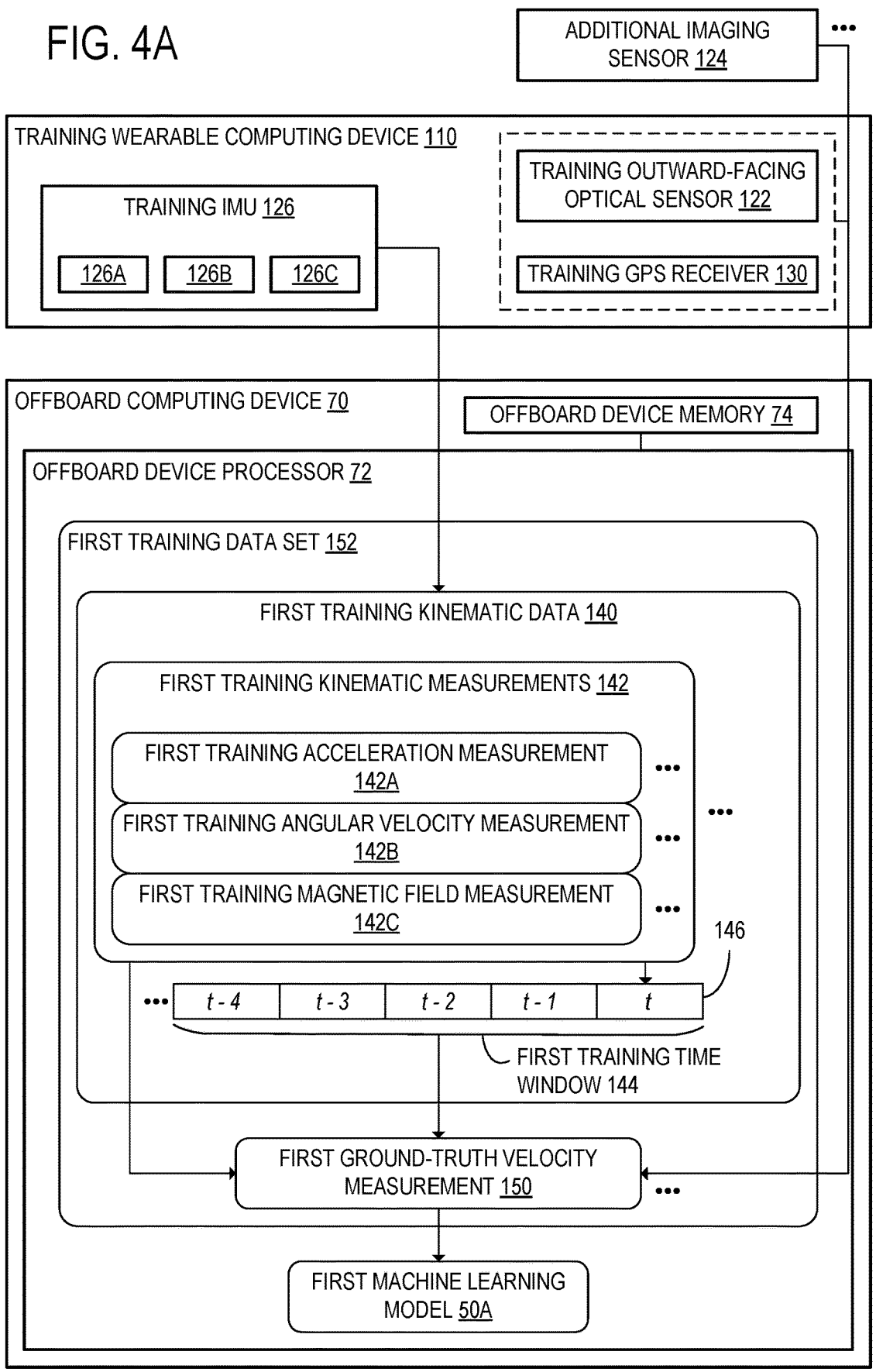
FIG. 4A schematically shows a training wearable computing device and an offboard computing device during training of the first machine learning model of FIG. 2A.

FIG. 4A schematically shows the training of the first machine learning model 50A, according to one example. The first machine learning model 50A may be trained using a training wearable computing device 110 that is configured to communicate with an offboard computing device 70. The training wearable computing device 110 may include a training IMU 126, which may, for example, include one or more training accelerometers 126A, one or more training gyroscopes 126B, and one or more training magnetometers 126C. In addition, the training wearable computing device 110 may further include one or more training outward-facing optical sensors 122 and a training GPS receiver 130. In some examples, the training wearable computing device 110 may have substantially the same hardware configuration as the wearable computing device 10.

The offboard computing device 70 may be configured to receive first training kinematic data 140 from the training wearable computing device 110. The first training kinematic data 140 may include a plurality of first training kinematic measurements 142 collected at the training IMU 126 during a corresponding plurality of first training timesteps 146. For example, each of the first training kinematic measurements 142 may include one or more first training acceleration measurements 142A, one or more first training angular velocity measurements 142B, and/or one or more first training magnetic field measurements 142C. The plurality of first training timesteps 146 may be included in a first training time window 144 during which the first training kinematic data 140 is collected. The first training kinematic data 140 may be collected while a user is wearing the training wearable computing device 110.

The offboard device processor 72 of the offboard computing device 70 may be further configured to receive a plurality of first ground-truth velocity measurements 150 from the training wearable computing device 110. The plurality of first ground-truth velocity measurements 150 may be paired with respective first training kinematic measurements 142 of the plurality of first training kinematic measurements 142, thereby forming a first training data set 152. The plurality of first ground-truth velocity measurements 150 may be collected at least in part via GPS using the training GPS receiver 130. Additionally or alternatively, the plurality of first ground-truth velocity measurements 150 may be collected at least in part by performing visual simultaneous localization and mapping (SLAM) on imaging data collected at the one or more training outward-facing optical sensors 122. In some examples, sensor fusion may be performed on GPS data and imaging data to determine the plurality of first ground-truth velocity measurements 150. When sensor fusion is used to determine the plurality of first ground-truth velocity measurements 150, kinematic data collected at the training IMU 126 may also be incorporated into the plurality of first ground-truth velocity measurements 150 in some examples. Accordingly, in such examples, the plurality of first ground-truth velocity measurements 150 may be collected via GPS-inertial odometry or visual-inertial odometry. Additionally or alternatively, in some examples, the plurality of first ground-truth velocity measurements 150 may be determined at least in part based on imaging data received from one or more additional imaging sensors 124 that are provided separately from the training wearable computing device 110 and configured to image the training wearable computing device 110 while the plurality of first training kinematic measurements 142 are collected.

The offboard device processor 72 of the offboard computing device 70 may be configured to train the first machine learning model 50A such that the first machine learning model 50A is configured to output a current velocity estimate 52A of the training wearable computing device 110 at the end of a time window 44 when the first machine learning model 50A receives the kinematic data 40 for that time window 44. Accordingly, the first machine learning model 50A may be used to generate current velocity estimates 52A at wearable computing devices 10 that have substantially the same hardware configuration as the training wearable computing device 110.

Figure 4B:
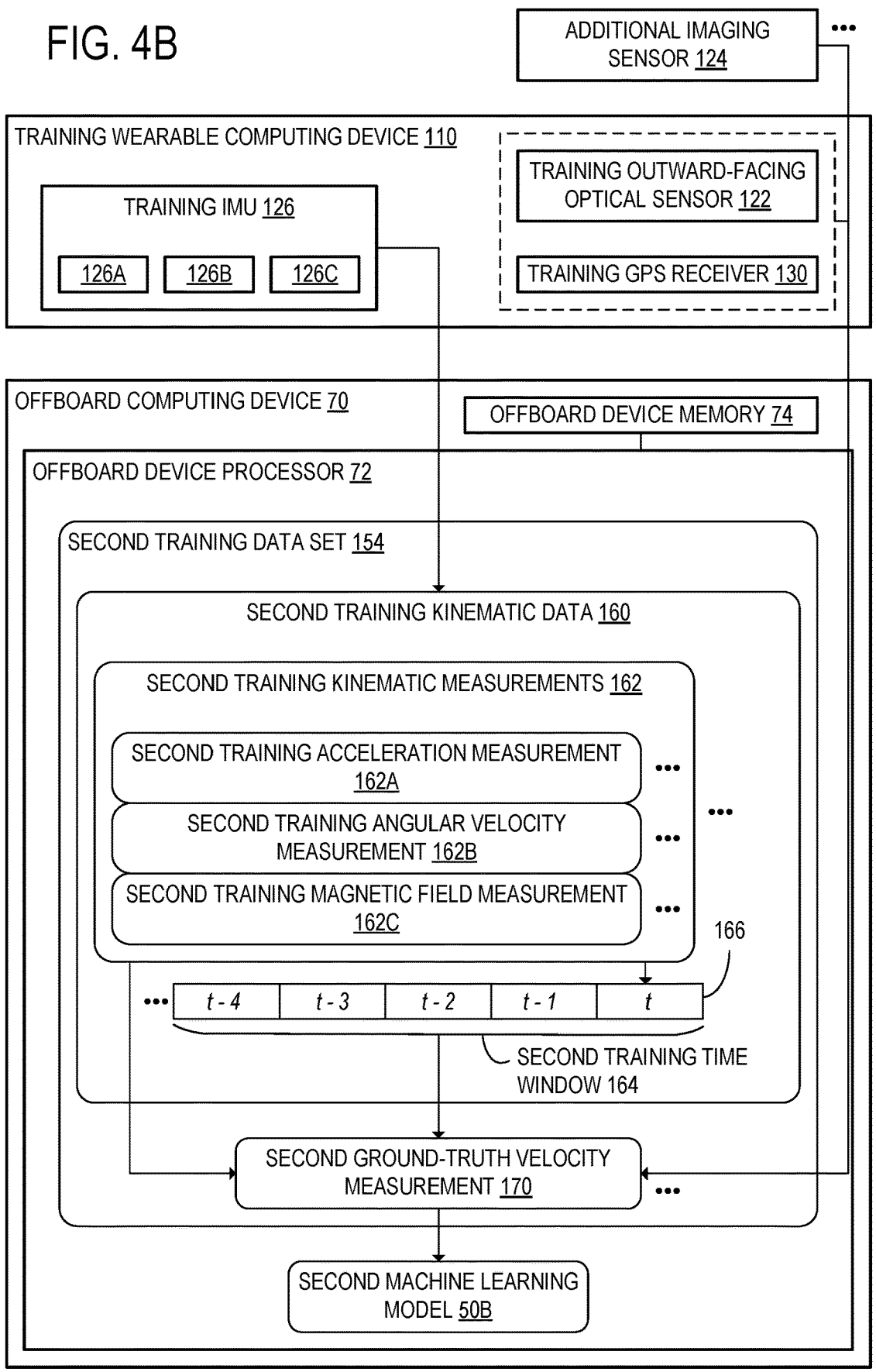
FIG. 4B schematically shows a training wearable computing device and an offboard computing device during training of the second machine learning model of FIG. 2A.

FIG. 4B schematically shows the training of the second machine learning model 50B, according to one example. The second machine learning model 50B may be trained on a second training data set 154 including second training kinematic data 160. The second training kinematic data 160 may be collected at the training wearable computing device 110 and may include a plurality of second training kinematic measurements 162 collected at the training IMU 126. Each of the second training kinematic measurements 162 may be associated with a corresponding second training timestep 166 in which the second training kinematic measurement 162 was collected, and may include one or more second training acceleration measurements 162A, one or more second training angular velocity measurements 162B, and/or one or more second training magnetic field measurements 162C. The plurality of second training timesteps 166 may be included in a second training time window 164 in which the second training kinematic data 160 is collected.

The second training data set 154 may further include a plurality of second ground-truth velocity measurements 170 paired with respective second training kinematic measurements 162 of the plurality of second training kinematic measurements 162. Similarly to the plurality of first ground-truth velocity measurements 150, the plurality of second ground-truth velocity measurements 170 may be collected using a GPS, visual SLAM, GPS-inertial odometry, or visual-inertial odometry. In some examples, the plurality of second ground-truth velocity measurements 170 may be determined at least in part based on the imaging data received from the one or more additional imaging sensors 124 provided externally to the training wearable computing device 110.

The offboard device processor 72 of the offboard computing device 70 may be configured to train the second machine learning model 50B such that the second machine learning model 50B is configured to output a prior velocity estimate 52B of the training wearable computing device 110 at the end of a time window 44 when the second machine learning model 50B receives the kinematic data 40 for that time window 44. The second machine learning model 50B may be used to generate prior velocity estimates 52B at wearable computing devices 10 that have substantially the same hardware configuration as the training wearable computing device 110.

FIG. 4C shows the training wearable computing device 110 and the offboard computing device 70 when the unified machine learning model 50C is trained, according to one example. The unified machine learning model 50C may be trained on a unified training data set 156. The unified training data set 156 may include training kinematic data 80, which may include a plurality of unified training kinematic measurements 182 collected at the training IMU 126. Each of the unified training kinematic measurements 182 may, for example, include a unified training acceleration measurement 182A, a unified training angular velocity measurement 182B, and/or a unified training magnetic field measurement 182C. Each unified training kinematic measurement 182 may be associated with a corresponding unified training timestep 186. The plurality of unified training timesteps 186 may be included in a unified training time window 184 for which the training kinematic data 180 is collected.

The unified training data set 156 may further include a plurality of first ground-truth velocity measurements 150 and a plurality of second ground-truth velocity measurements 170 associated with respective unified training kinematic measurements 182 of the plurality of unified training kinematic measurements 182 included in the unified training kinematic data 180. The plurality of first ground-truth velocity measurements 150 and the plurality of second ground-truth velocity measurements 170 may be collected as discussed above with reference to FIGS. 4A-4B. The offboard device processor 72 of the offboard computing device 70 may be configured to train the unified machine learning model 50C such that the unified machine learning model 50C is configured to generate both current velocity estimates 52A and prior velocity estimates 52B for the training wearable computing device 110.

Figure 5:
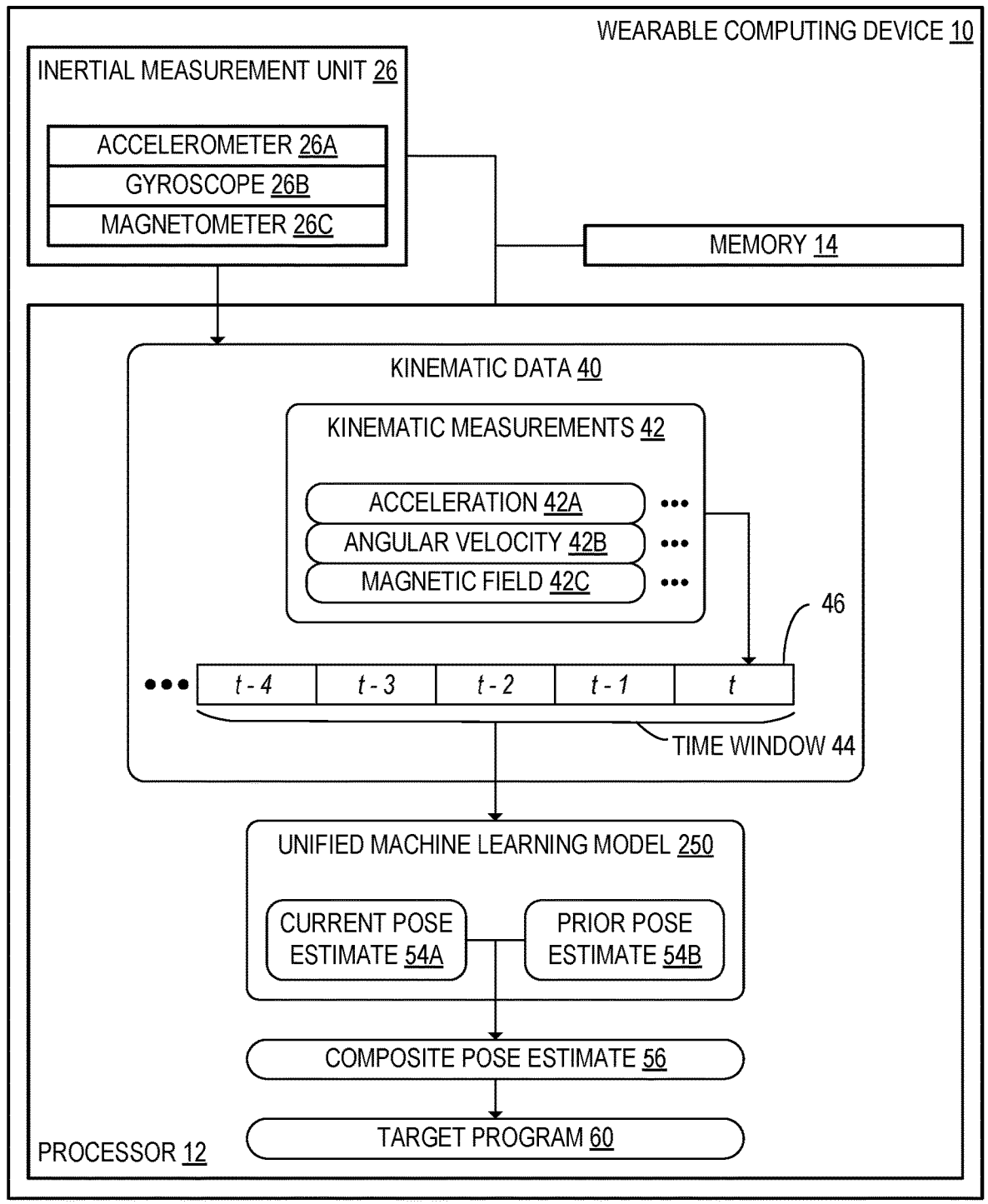
FIG. 5 schematically shows the wearable computing device when the processor of the wearable computing device computes a composite pose estimate at a unified machine learning model, according to the example of FIG. 1A.

In some examples, as shown in FIG. 5, the processor 12 of the wearable computing device 10 may be configured to implement a unified machine learning model 250 that directly generates the composite pose estimate 56 from the kinematic data 40. In such examples, the current velocity estimate 52A and the prior velocity estimate 52B may be encoded at one or more deep layers of the unified machine learning model. The current pose estimate 54A and the prior pose estimate 54B may also be computed at one or more deep layers of the unified machine learning model 250. The composite pose estimate 56 may then be computed within the unified machine learning model 250 rather than by a separate function or module that receives the current pose estimate 54A and the prior pose estimate 54B. In one example, the unified machine learning model 250 may include a first upstream model segment that is trained to output the current velocity estimate 52A and the prior velocity estimate 52B as intermediate values that are consumed as input by a second downstream model segment that in turn is trained to output the composite pose estimate 56.

Figure 6:
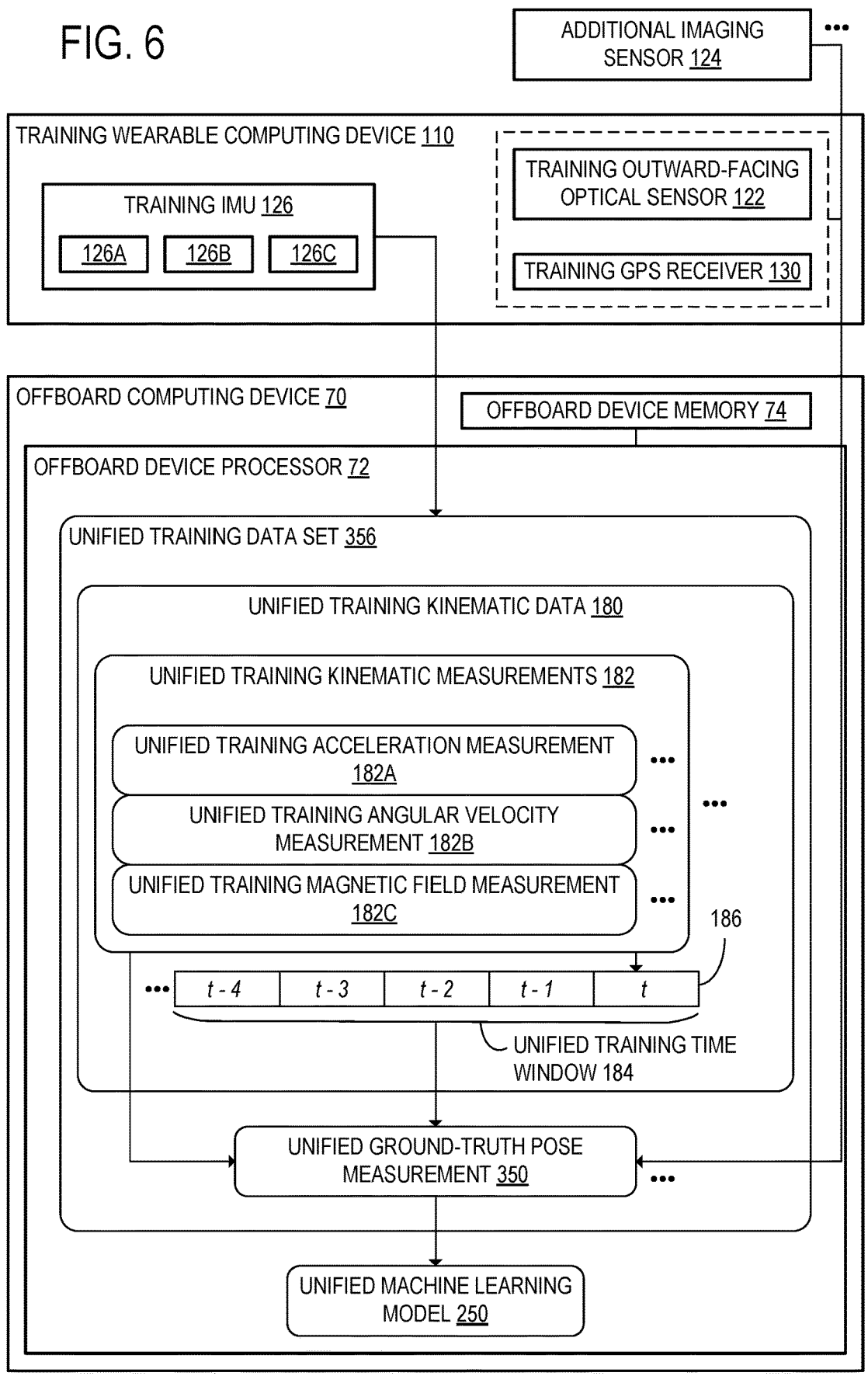
FIG. 6 schematically shows a training wearable computing device and an offboard computing device during training of the unified machine learning model of FIG. 5.

FIG. 6 schematically shows the training wearable computing device 110 and the offboard computing device 70 during training of the unified machine learning model 250 of FIG. 5, according to one example. In the example of FIG. 6, the unified machine learning model 250 may be trained end-to-end using a unified training data set 356. The unified training data set 356 of FIG. 6 includes unified training kinematic data 180, as in the example of FIG. 4C, and further includes a plurality of unified ground-truth pose measurements 350. The plurality of unified ground-truth pose measurements 350 are measurements of the position and angular orientation of the training wearable computing device 110. Similarly to the first ground-truth velocity measurements 150 and the second ground-truth velocity measurements 170, the plurality of unified ground-truth pose measurements 350 may be collected using a GPS, visual SLAM, GPS-inertial odometry, or visual-inertial odometry. The plurality of ground-truth pose measurements 350 may, in some examples, be computed based at least in part on imaging data received from one or more additional imaging sensors 124 that are provided externally to the training wearable computing device 110 and are configured to image the training wearable computing device 110. A unified machine learning model 250 that is trained end-to-end may, for example, be used when the plurality of ground-truth pose measurements 350 are more accurate or easier to collect than ground-truth velocity measurements.

Figure 7A:
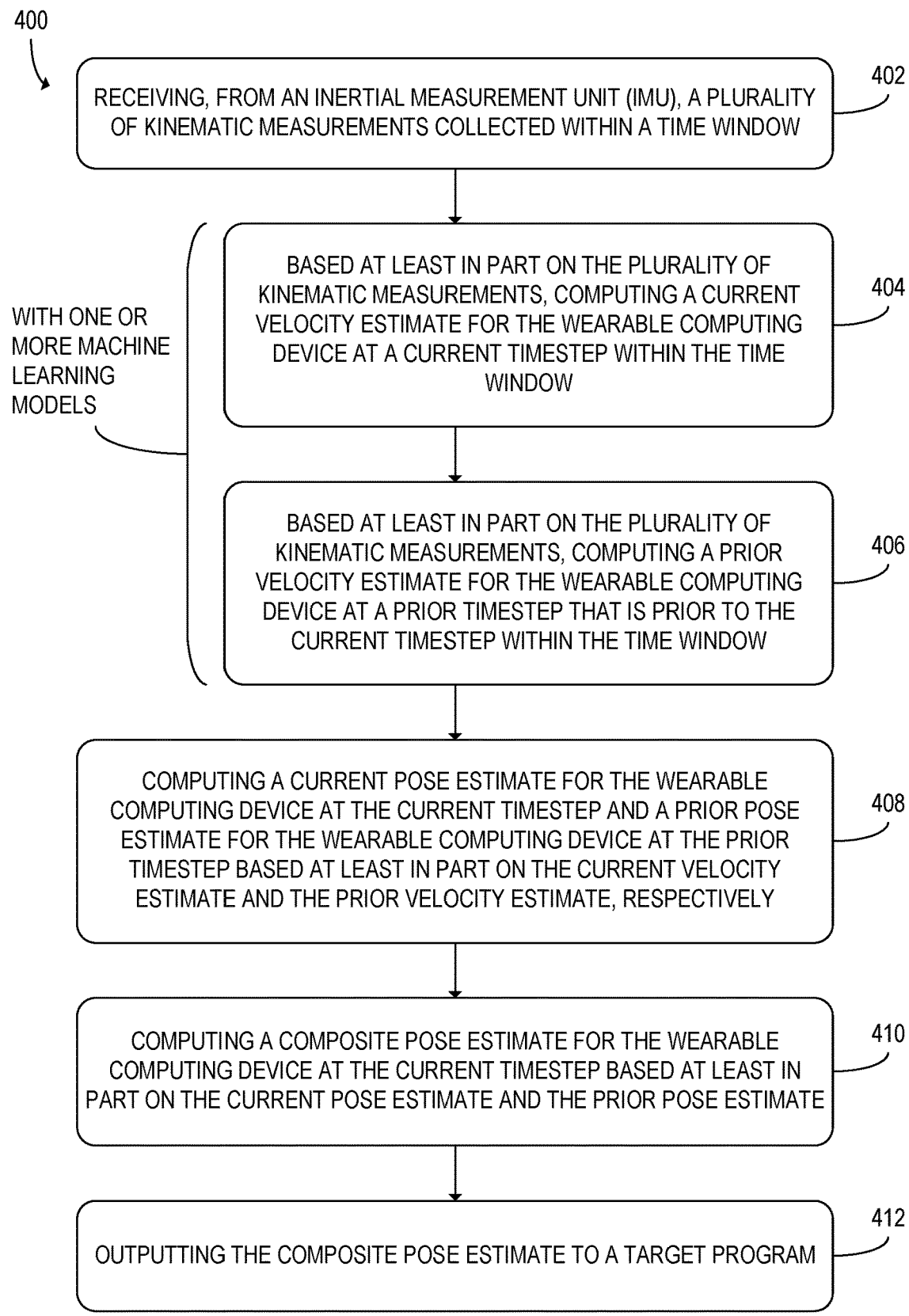
FIG. 7A shows a flowchart of an example method for use with a wearable computing device, according to the example of FIG. 1A.

FIG. 7A shows a flowchart of an example method 400 for use with a wearable computing device. The wearable computing device with which the method 400 is performed may include a device body configured to be mounted on a body of a user. For example, the wearable computing device may be a head-mounted display device. The method 400 may be performed with the example wearable computing device 10 of FIG. 1A or with some other wearable computing device.

At step 402, the method 400 may include receiving, from an IMU, a plurality of kinematic measurements collected within a time window. The IMU from which the kinematic measurements are collected may include one or more accelerometers, one or more gyroscopes, and/or one or more magnetometers located within the wearable computing device. The plurality of kinematic measurements may, for example, include one or more acceleration measurements, one or more angular velocity measurements, and/or one or more magnetic field measurements. The time window may be divided into a plurality of timesteps, and a kinematic measurement may be received at each timestep of the plurality of timesteps included in the time window. In some examples, the different quantities measured at the IMU may be received at different subsets of the plurality of timesteps such that the kinematic measurements include values of different variables at different timesteps. For example, the IMU may collect magnetic field measurements less frequently than acceleration measurements or angular velocity measurements.

Step 404 and step 406 of the method 400 may be performed at one or more machine learning models. At step 404, based at least in part on the plurality of kinematic measurements, the method 400 may include computing a current velocity estimate for the wearable computing device at a current timestep within the time window. The current timestep may be a most recent timestep in the time window. At step 406, based at least in part on the plurality of kinematic measurements, the method 400 may further include computing a prior velocity estimate for the wearable computing device at a prior timestep that is prior to the current timestep within the time window. For example, the prior timestep may be located at a midpoint of the time window. Other locations in the time window may be used for the prior timestep in other examples. The current velocity estimate and the prior velocity estimate may be corresponding estimates of the translational velocity of the wearable computing device at the current timestep and the prior timestep of the time window. The current velocity estimate and the prior velocity estimate may, in some examples, include estimated angular velocities of the wearable computing device at the current timestep and the prior timestep, respectively, as well as the translational velocities of the wearable computing device at the current timestep and the prior timestep.

In some examples, the one or more machine learning models at which step 404 and step 406 are performed may include a first machine learning model at which the current velocity estimate is computed and a second machine learning model at which the prior velocity estimate is computed. For example, the first machine learning model and the second machine learning model may be a first TCN and a second TCN, respectively. Alternatively, the first machine learning model and/or the second machine learning model may be some other type of machine learning model, such as an LSTM or a GRU. In other examples, instead of a first machine learning model and a second machine learning model, the one or more machine learning models may include a unified machine learning model at which the current velocity estimate and the prior velocity estimate are computed. The unified machine learning model may be a TCN, an LSTM, a GRU, or some other type of machine learning model.

At step 408, the method 400 may further include computing a current pose estimate for the wearable computing device at the current timestep and a prior pose estimate for the wearable computing device at the prior timestep. The current pose estimate and the prior pose estimate may be computed based at least in part on the current velocity estimate and the prior velocity estimate, respectively. Computing the current pose estimate and the prior pose estimate may, for example, include performing numerical integration on the current velocity estimate and the prior velocity estimate to determine respective pose offsets. In this example, the pose offsets computed for the current timestep and the prior timestep may be added to previously computed pose estimates to determine the current pose estimate and the prior pose estimate.

At step 410, the method 400 may further include computing a composite pose estimate for the wearable computing device at the current timestep based at least in part on the current pose estimate and the prior pose estimate. At step 412, the method 400 may further include outputting the composite pose estimate to a target program. For example, the target program may be a target program that is configured to output virtual content items to be displayed to the user in a mixed-reality environment.

Figure 7B:
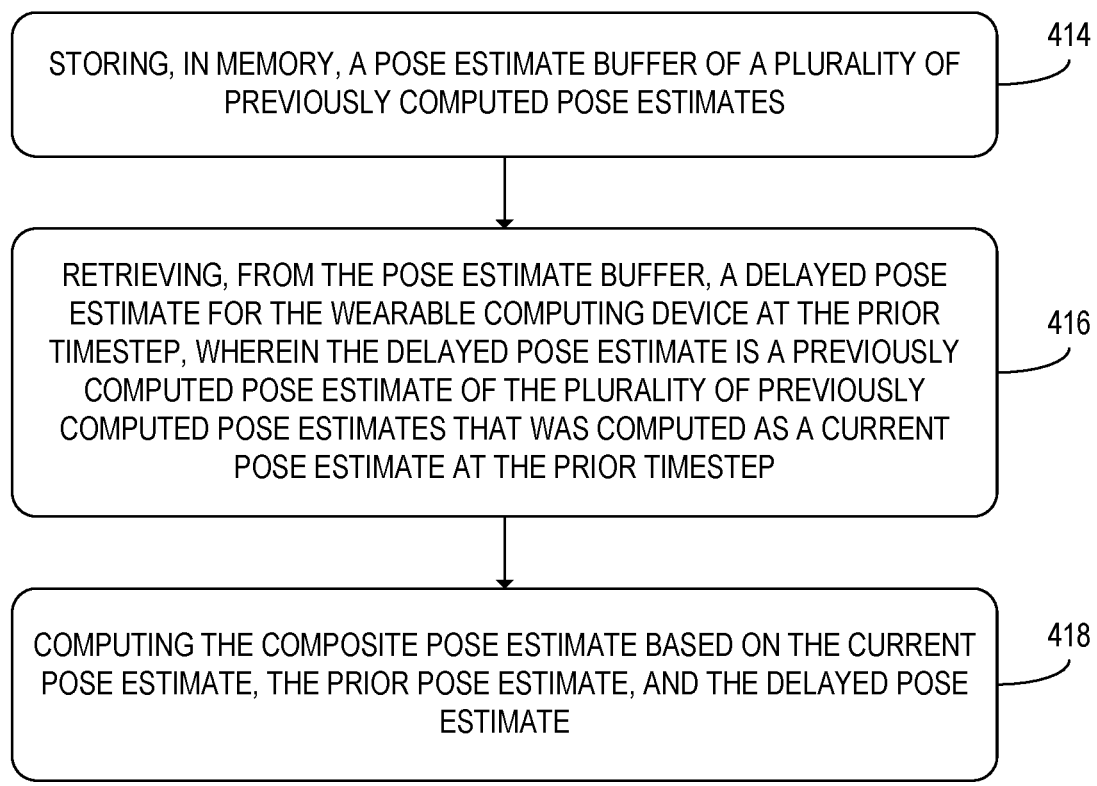
FIG. 7B shows additional steps of the method of FIG. 7B that may be performed in some examples when a pose estimate buffer is stored in memory.

FIG. 7B shows additional steps of the method 400 that may be performed in some examples. At step 414, the method 400 may further include storing, in memory, a pose estimate buffer of a plurality of previously computed pose estimates. The plurality of previously computed pose estimates may include a plurality of current pose estimates and/or prior pose estimates computed at previous timesteps in the time window. In some examples, one or more of the plurality of previously computed pose estimates may have been computed via GPS, visual SLAM, GPS-inertial odometry, or visual-inertial odometry rather than through dead reckoning.

Step 416 and step 418 of the method 400 may be performed when computing the composite pose estimate at step 410. At step 416, the method 400 may further include retrieving, from the pose estimate buffer, a delayed pose estimate for the wearable computing device at the prior timestep. The delayed pose estimate may be a previously computed pose estimate of the plurality of previously computed pose estimates that was computed as a current pose estimate at the prior timestep. At step 418, the method 400 may further include computing the composite pose estimate based on the current pose estimate, the prior pose estimate, and the delayed pose estimate. The delayed pose estimate may be used to compute a coordinate system transformation from a reference frame of the current pose estimate to a reference frame of the prior pose estimate and back to the reference frame of the current pose estimate. This coordinate system transformation may reduce error in the current pose estimate.

Figure 7C:
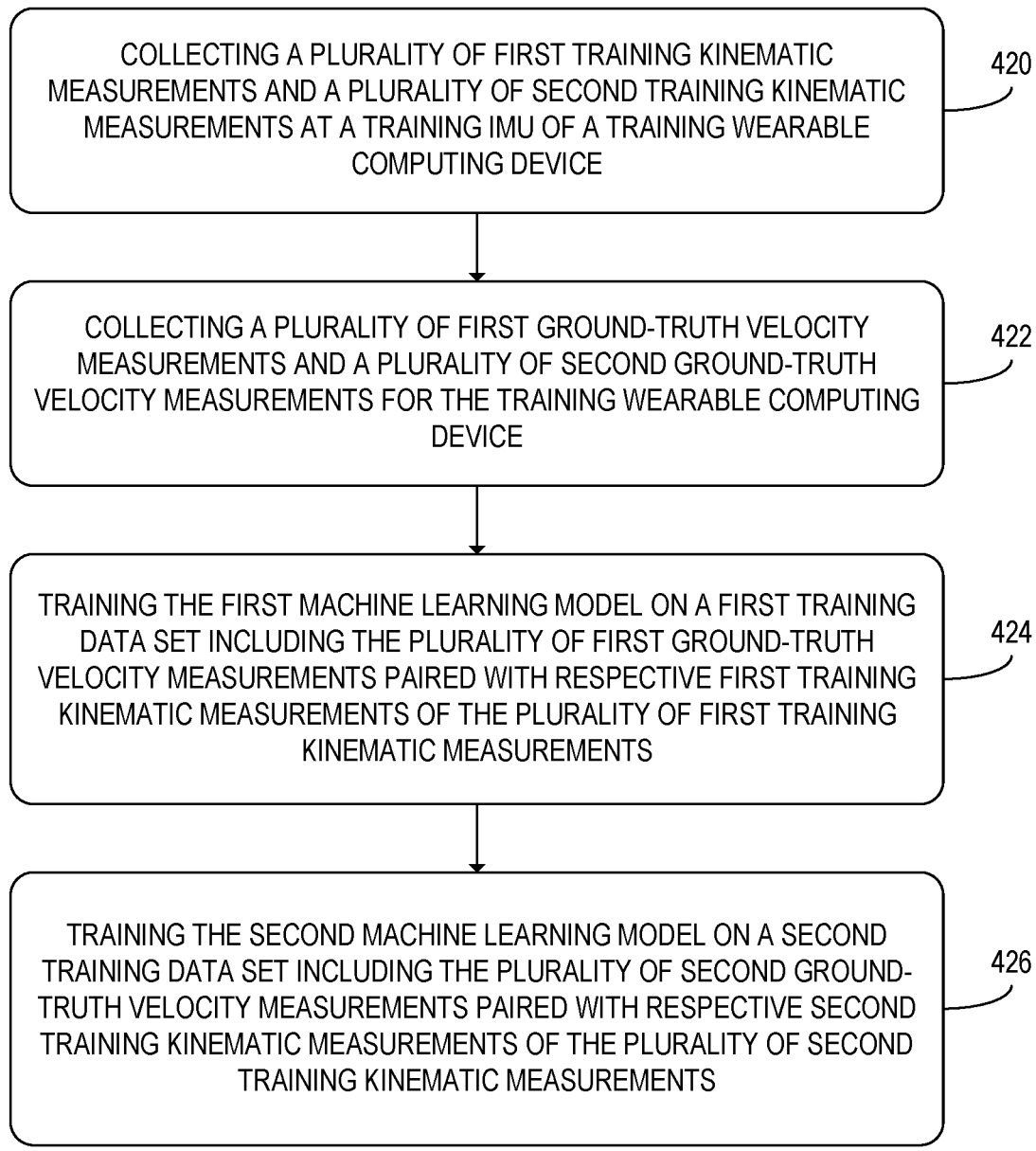
FIG. 7C shows additional steps of the method of FIG. 7A that may be performed in some examples when training a first machine learning model and a second machine learning model.

FIG. 7C shows additional steps of the method 400 that may be performed in some examples to train the one or more machine learning models. At step 420, the method 400 may further include collecting a plurality of first training kinematic measurements and a plurality of second training kinematic measurements at a training IMU of a training wearable computing device. The training IMU may, for example, include one or more accelerometers, one or more gyroscopes, and one or more magnetometers with which the training IMU may be configured to collect a plurality of first and second training acceleration measurements, training angular velocity measurements, and training magnetic field measurements.

At step 422, the method 400 may further include collecting a plurality of first ground-truth velocity measurements and a plurality of second ground-truth velocity measurements for the training wearable computing device. In some examples, the plurality of first ground-truth velocity measurements and the plurality of second ground-truth velocity measurements may be collected using a GPS, visual SLAM, GPS-inertial odometry, or visual-inertial odometry. Additionally or alternatively, the plurality of first ground-truth velocity measurements and/or the plurality of second ground-truth velocity measurements may be collected at least in part using one or more additional imaging sensors provided externally to the wearable computing device.

At step 424, the method 400 may further include training the first machine learning model on a first training data set including the plurality of first ground-truth velocity measurements paired with respective first training kinematic measurements of the plurality of first training kinematic measurements. The first machine learning model may be trained to generate velocity estimates for the training wearable computing device at the current time when the first machine learning model receives kinematic measurements as inputs. At step 426, the method 400 may further include training the second machine learning model on a second training data set including the plurality of second ground-truth velocity measurements paired with respective second training kinematic measurements of the plurality of second training kinematic measurements. The second machine learning model may be trained to generate velocity estimates for the training wearable computing device at the prior time when the second machine learning model receives kinematic measurements as inputs.

Figure 7D:
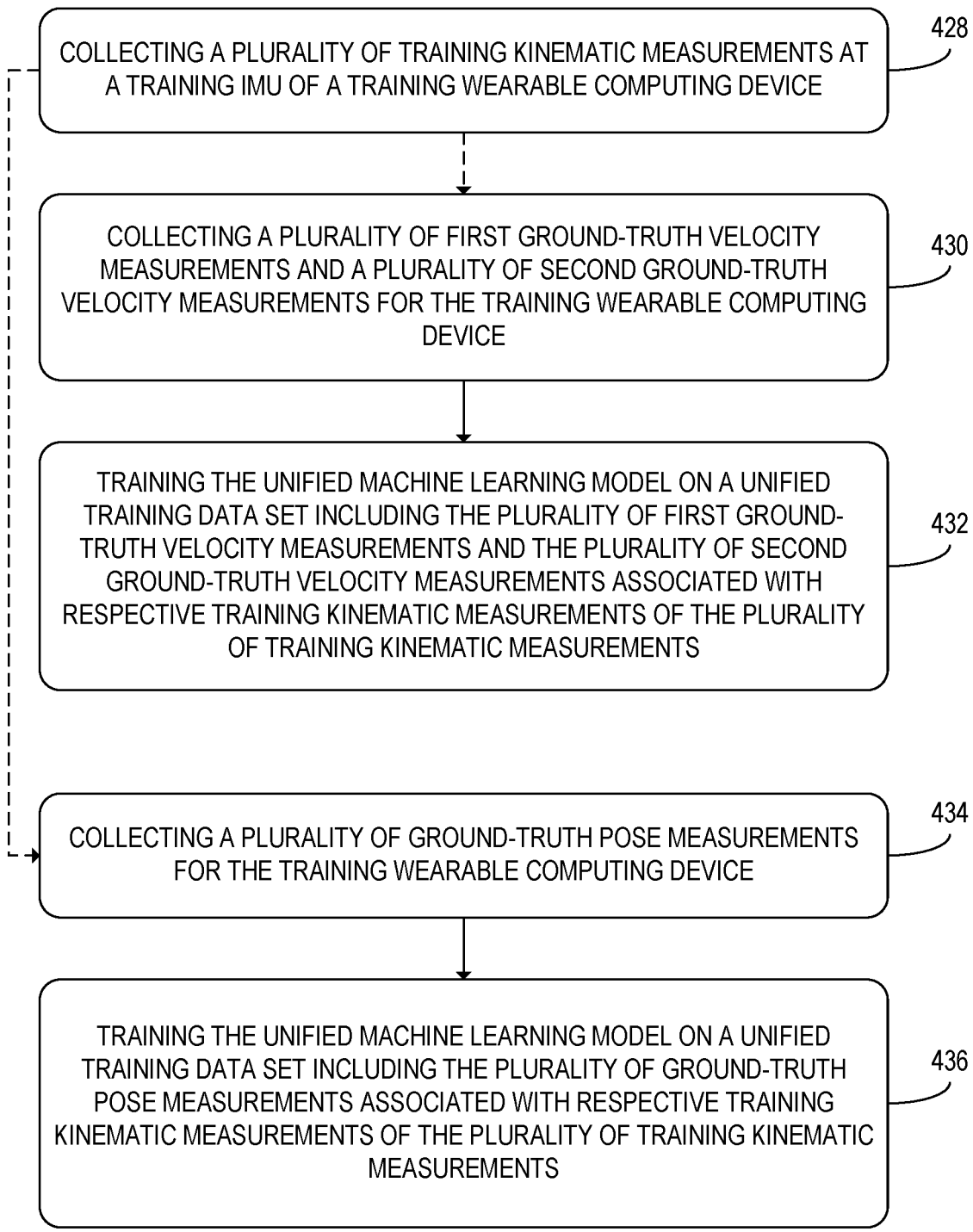
FIG. 7D shows additional steps of the method of FIG. 7A that may be performed in some examples when training a unified machine learning model.

FIG. 7D shows additional steps of the method 400 that may be performed in some examples to train a unified machine learning model. At step 428, the method 400 may further include collecting a plurality of training kinematic measurements at a training IMU of a training wearable computing device. The plurality of training kinematic measurements may, for example, include one or more training acceleration measurements, one or more training angular velocity measurements, and/or one or more training magnetic field measurements.

At step 430, the method 400 may further include collecting a plurality of first ground-truth velocity measurements and a plurality of second ground-truth velocity measurements for the training wearable computing device. For example, the plurality of first ground-truth velocity measurements and the plurality of second ground-truth velocity measurements may be collected using a GPS, visual SLAM, GPS-inertial odometry, or visual-inertial odometry. The plurality of first ground-truth velocity measurements and the plurality of second ground-truth velocity estimates may include translational velocity measurements for the training wearable computing device and may further include rotational velocity measurements for the training wearable computing device in some examples. In some examples, the plurality of first ground-truth velocity measurements and the plurality of second ground-truth velocity measurements may be received at least in part from one or more external imaging sensors configured to image the wearable computing device.

At step 432, the method 400 may further include training the unified machine learning model on a unified training data set including the plurality of first ground-truth velocity measurements and the plurality of second ground-truth velocity measurements associated with respective training kinematic measurements of the plurality of training kinematic measurements. The unified machine learning model may be trained to output both a current velocity estimate and a prior velocity estimate when the unified machine learning model receives kinematic data collected at an IMU.

FIG. 7D further shows, in step 434 and step 436, steps of the method 400 that may be performed as an alternative to step 430 and step 432, according to one example. At step 434, the method 400 may further include collecting a plurality of ground-truth pose measurements for the training wearable computing device. The plurality of ground-truth pose estimates may each indicate a spatial position of the training wearable computing device. In some examples, the plurality of ground-truth pose estimates may further indicate a plurality of angular orientations of the training wearable computing device at the plurality of timesteps included in the time window for which the plurality of training kinematic measurements and the plurality of ground-truth pose measurements are collected.

At step 436, the method 400 may further include training the unified machine learning model on a unified data set including the plurality of ground-truth pose measurements associated with respective training kinematic measurements of the plurality of training kinematic measurements. Accordingly, the unified machine learning model may be trained end-to-end to directly output a compose pose estimate rather than outputting velocity estimates from which the composite pose estimate may be computed.

In one example use case scenario, the wearable computing device may be a head-mounted display device used by a firefighter in an area in which visibility is limited due to smoke. The limited visibility may interfere with accurate determination of the pose of the wearable computing device using visual SLAM. Thus, the processor may instead estimate the pose of the wearable computing device via inertial odometry using the methods discussed above. As another example, the systems and methods discussed above may be used to determine the pose of the wearable computing device in underground areas in which visibility may be limited and GPS signals may be unavailable. With the systems and methods discussed above, the processor may be configured to estimate the pose of the wearable computing device with both high accuracy and low latency in conditions in which imaging data and/or GPS data is unavailable or unreliable.

Although, in the examples provided above, the wearable computing device is a head-mounted display device, the wearable computing device may take other forms in other examples. For example, the wearable computing device may be a body camera device that is configured to be mounted on a front of a user's body and to image an area of the physical environment in front of the user. In such examples, the wearable computing device may be mounted at a location on the user's body that undergoes a repetitive movement as the user travels through the physical environment. Accordingly, when the one or more machine learning models are trained, the training data used to train the one or more machine learning models may be focused on instances of the repetitive motion rather than including large amounts of training data for a wide variety of movement patterns. Accordingly, the computational costs associated with training the one or more machine learning models may be reduced.

In some examples, rather than being used with a wearable computing device, the systems and methods discussed above may be used with a vehicle when the vehicle undergoes motion that is not substantially constant. For example, the processor of a computing device mounted in the vehicle may be configured to estimate the pose of the vehicle when the vehicle travels over an uneven surface such as the surface of an off-road area. The vehicle may, for example, be an automobile, a bicycle, a motorcycle, or some other type of vehicle. Alternatively, the vehicle may be a ship or boat traveling over a water surface. When the vehicle travels over the uneven surface, an IMU included in the vehicle may be configured to collect kinematic data that may be used as an input to the one or more machine learning models. The processor of the computing device may be further configured to generate a composite pose estimate for the vehicle.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
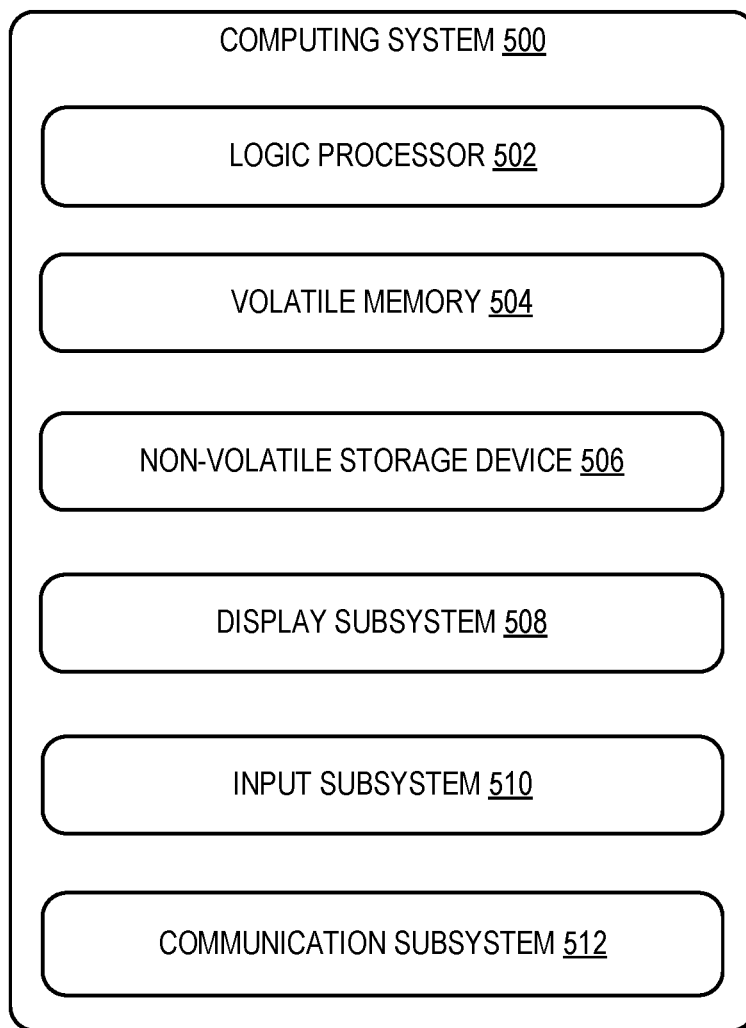
FIG. 8 shows a schematic view of an example computing environment in which the wearable computing device of FIG. 1A may be instantiated.

FIG. 8 schematically shows a non-limiting embodiment of a computing system 500 that can enact one or more of the methods and processes described above. Computing system 500 is shown in simplified form. Computing system 500 may embody the wearable computing device 10 described above and illustrated in FIG. 1A. Components of computing system 500 may be included in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 8.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs discuss several aspects of the present disclosure. According to one aspect of the present disclosure, a wearable computing device is provided, including a device body configured to be mounted on a body of a user, an inertial measurement unit (IMU), and a processor. The processor may be configured to receive, from the IMU, a plurality of kinematic measurements collected within a time window. With one or more machine learning models, the processor may be further configured to, based at least in part on the plurality of kinematic measurements, compute a current velocity estimate for the wearable computing device at a current timestep within the time window, and based at least in part on the plurality of kinematic measurements, compute a prior velocity estimate for the wearable computing device at a prior timestep that is prior to the current timestep within the time window. The processor may be further configured to compute a current pose estimate for the wearable computing device at the current timestep and a prior pose estimate for the wearable computing device at the prior timestep based at least in part on the current velocity estimate and the prior velocity estimate, respectively. The processor may be further configured to compute a composite pose estimate for the wearable computing device at the current timestep based at least in part on the current pose estimate and the prior pose estimate. The processor may be further configured to output the composite pose estimate to a target program.

According to this aspect, the one or more machine learning models may include a first machine learning model at which the current velocity estimate is computed and a second machine learning model at which the prior velocity estimate is computed.

According to this aspect, the first machine learning model and the second machine learning model may be a first temporal convolutional network and a second temporal convolutional network, respectively.

According to this aspect, the first machine learning model may be trained on a first training data set including a plurality of first training kinematic measurements collected at a training IMU and a plurality of first ground-truth velocity measurements paired with respective first training kinematic measurements of the plurality of first training kinematic measurements.

According to this aspect, the second machine learning model may be trained on a second training data set including a plurality of second training kinematic measurements collected at the training IMU and a plurality of second ground-truth velocity measurements paired with respective second training kinematic measurements of the plurality of second training kinematic measurements.

According to this aspect, the plurality of first ground-truth velocity measurements and the plurality of second ground-truth velocity measurements may be collected using a global positioning system (GPS), visual simultaneous localization and mapping (SLAM), GPS-inertial odometry, or visual-inertial odometry.

According to this aspect, the one or more machine learning models may include a unified machine learning model trained on a unified training data set including a plurality of training kinematic measurements collected at a training IMU and a plurality of first ground-truth velocity measurements and a plurality of second ground-truth velocity measurements associated with respective training kinematic measurements of the plurality of training kinematic measurements. The current velocity estimate and the prior velocity estimate may be computed at the unified machine learning model.

According to this aspect, the prior timestep may be located at a midpoint of the time window.

According to this aspect, the wearable computing device may further include memory storing a pose estimate buffer of a plurality of previously computed pose estimates. When computing the composite pose estimate, the processor may be configured to retrieve, from the pose estimate buffer, a delayed pose estimate for the wearable computing device at the prior timestep. The delayed pose estimate may be a previously computed pose estimate of the plurality of previously computed pose estimates that was computed as a current pose estimate at the prior timestep. The processor may be further configured to compute the composite pose estimate based on the current pose estimate, the prior pose estimate, and the delayed pose estimate.

According to this aspect, the wearable computing device may be a head-mounted display device.

According to another aspect of the present disclosure, a method is provided for use with a wearable computing device that includes a device body configured to be mounted on a body of a user. The method may include receiving, from an inertial measurement unit (IMU), a plurality of kinematic measurements collected within a time window. The method may further include, with one or more machine learning models, based at least in part on the plurality of kinematic measurements, computing a current velocity estimate for the wearable computing device at a current timestep within the time window, and based at least in part on the plurality of kinematic measurements, computing a prior velocity estimate for the wearable computing device at a prior timestep that is prior to the current timestep within the time window. The method may further include computing a current pose estimate for the wearable computing device at the current timestep and a prior pose estimate for the wearable computing device at the prior timestep based at least in part on the current velocity estimate and the prior velocity estimate, respectively. The method may further include computing a composite pose estimate for the wearable computing device at the current timestep based at least in part on the current pose estimate and the prior pose estimate. The method may further include outputting the composite pose estimate to a target program.

According to this aspect, the one or more machine learning models may include a first machine learning model at which the current velocity estimate is computed and a second machine learning model at which the prior velocity estimate is computed.

According to this aspect, the first machine learning model and the second machine learning model may be a first temporal convolutional network and a second temporal convolutional network, respectively.

According to this aspect, the method may further include collecting a plurality of first training kinematic measurements and a plurality of second training kinematic measurements at a training IMU of a training wearable computing device. The method may further include collecting a plurality of first ground-truth velocity measurements and a plurality of second ground-truth velocity measurements for the training wearable computing device. The method may further include training the first machine learning model on a first training data set including the plurality of first ground-truth velocity measurements paired with respective first training kinematic measurements of the plurality of first training kinematic measurements. The method may further include training the second machine learning model on a second training data set including the plurality of second ground-truth velocity measurements paired with respective second training kinematic measurements of the plurality of second training kinematic measurements.

According to this aspect, the plurality of first ground-truth velocity measurements and the plurality of second ground-truth velocity measurements may be collected using a global positioning system (GPS), visual simultaneous localization and mapping (SLAM), GPS-inertial odometry, or visual-inertial odometry.

According to this aspect, the one or more machine learning models may include a unified machine learning model at which the current velocity estimate and the prior velocity estimate are computed. The method may further include collecting a plurality of training kinematic measurements at a training IMU of a training wearable computing device. The method may further include collecting a plurality of first ground-truth velocity measurements and a plurality of second ground-truth velocity measurements for the training wearable computing device. The method may further include training the unified machine learning model on a unified training data set including the plurality of first ground-truth velocity measurements and the plurality of second ground-truth velocity measurements associated with respective training kinematic measurements of the plurality of training kinematic measurements.

According to this aspect, the prior timestep may be located at a midpoint of the time window.

According to this aspect, the method may further include storing, in memory, a pose estimate buffer of a plurality of previously computed pose estimates. When computing the composite pose estimate, the method may further include retrieving, from the pose estimate buffer, a delayed pose estimate for the wearable computing device at the prior timestep. The delayed pose estimate may be a previously computed pose estimate of the plurality of previously computed pose estimates that was computed as a current pose estimate at the prior timestep. The method may further include computing the composite pose estimate based on the current pose estimate, the prior pose estimate, and the delayed pose estimate.

According to this aspect, the wearable computing device may be a head-mounted display device.

According to another aspect of the present disclosure, a computing device is provided, including an inertial measurement unit (IMU) and a processor. The processor may be configured to receive, from the IMU, a plurality of kinematic measurements collected within a time window. With a first machine learning model, based at least in part on the plurality of kinematic measurements, the processor may be further configured to compute a current velocity estimate for the computing device at a current timestep within the time window. With a second machine learning model, based at least in part on the plurality of kinematic measurements, the processor may be further configured to compute a prior velocity estimate for the computing device at a prior timestep that is prior to the current timestep within the time window. The processor may be further configured to compute a current pose estimate for the computing device at the current timestep and a prior pose estimate for the computing device at the prior timestep based at least in part on the current velocity estimate and the prior velocity estimate, respectively. The processor may be further configured to compute a composite pose estimate for the computing device at the current timestep based at least in part on the current pose estimate and the prior pose estimate. The processor may be further configured to output the composite pose estimate to a target program.

"And/or" as used herein is defined as the inclusive or ∨, as specified by the following truth table:

| A | B | A ∨ B |
| --- | --- | --- |
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wearable computing device comprising:
   a device body configured to be mounted on a body of a user;
   an inertial measurement unit (IMU); and
   a processor configured to:
      receive, from the IMU, a plurality of kinematic measurements collected within a time window;
      with one or more machine learning models:
         based at least in part on the plurality of kinematic measurements, compute a current velocity estimate for the wearable computing device at a current timestep within the time window; and
         at the current timestep, based at least in part on the plurality of kinematic measurements, recompute a prior velocity estimate for the wearable computing device from a prior timestep that is prior to the current timestep within the time window, wherein the prior velocity estimate is recomputed based at least in part on one or more kinematic measurements of the plurality of kinematic measurements collected subsequently to the prior timestep;
      at the current timestep, compute a current pose estimate for the wearable computing device at the current timestep and a prior pose estimate for the wearable computing device at the prior timestep based at least in part on the current velocity estimate and the prior velocity estimate, respectively;
      at the current timestep, compute a composite pose estimate for the wearable computing device at the current timestep based at least in part on the current pose estimate and the prior pose estimate; and
      output the composite pose estimate to a target program.

2. The wearable computing device of claim 1, wherein the one or more machine learning models include a first machine learning model at which the current velocity estimate is computed and a second machine learning model at which the prior velocity estimate is recomputed.

3. The wearable computing device of claim 2, wherein the first machine learning model and the second machine learning model are a first temporal convolutional network and a second temporal convolutional network, respectively.

4. The wearable computing device of claim 2, wherein the first machine learning model is trained on a first training data set including:
   a plurality of first training kinematic measurements collected at a training IMU; and
   a plurality of first ground-truth velocity measurements paired with respective first training kinematic measurements of the plurality of first training kinematic measurements.

5. The wearable computing device of claim 4, wherein the second machine learning model is trained on a second training data set including:
   a plurality of second training kinematic measurements collected at the training IMU; and
   a plurality of second ground-truth velocity measurements paired with respective second training kinematic measurements of the plurality of second training kinematic measurements.

6. The wearable computing device of claim 5, wherein the plurality of first ground-truth velocity measurements and the plurality of second ground-truth velocity measurements are collected using a global positioning system (GPS), visual simultaneous localization and mapping (SLAM), GPS-inertial odometry, or visual-inertial odometry.

7. The wearable computing device of claim 1, wherein:
   the one or more machine learning models include a unified machine learning model trained on a unified training data set including:
      a plurality of training kinematic measurements collected at a training IMU; and
      a plurality of first ground-truth velocity measurements and a plurality of second ground-truth velocity measurements associated with respective training kinematic measurements of the plurality of training kinematic measurements; and
   the current velocity estimate and the prior velocity estimate are computed at the unified machine learning model.

8. The wearable computing device of claim 1, wherein the prior timestep is located at a midpoint of the time window.

9. The wearable computing device of claim 1, further comprising memory storing a pose estimate buffer of a plurality of previously computed pose estimates, wherein, when computing the composite pose estimate, the processor is configured to:
   retrieve, from the pose estimate buffer, a delayed pose estimate for the wearable computing device at the prior timestep, wherein the delayed pose estimate is a previously computed pose estimate of the plurality of previously computed pose estimates that was computed as a current pose estimate at the prior timestep; and
   compute the composite pose estimate based on the current pose estimate, the prior pose estimate, and the delayed pose estimate.

10. The wearable computing device of claim 1, wherein the wearable computing device is a head-mounted display device.

11. A method for use with a wearable computing device that includes a device body configured to be mounted on a body of a user, the method comprising:
   receiving, from an inertial measurement unit (IMU), a plurality of kinematic measurements collected within a time window;
   with one or more machine learning models:
      based at least in part on the plurality of kinematic measurements, computing a current velocity estimate for the wearable computing device at a current timestep within the time window; and
      at the current timestep, based at least in part on the plurality of kinematic measurements, recomputing a prior velocity estimate for the wearable computing device from a prior timestep that is prior to the current timestep within the time window, wherein the prior velocity estimate is recomputed based at least in part on one or more kinematic measurements of the plurality of kinematic measurements collected subsequently to the prior timestep;
   computing a current pose estimate for the wearable computing device at the current timestep and a prior pose estimate for the wearable computing device at the prior timestep based at least in part on the current velocity estimate and the prior velocity estimate, respectively;
   computing a composite pose estimate for the wearable computing device at the current timestep based at least in part on the current pose estimate and the prior pose estimate; and outputting the composite pose estimate to a target program.

12. The method of claim 11, wherein the one or more machine learning models include a first machine learning model at which the current velocity estimate is computed and a second machine learning model at which the prior velocity estimate is recomputed.

13. The method of claim 12, wherein the first machine learning model and the second machine learning model are a first temporal convolutional network and a second temporal convolutional network, respectively.

14. The method of claim 12, further comprising:
collecting a plurality of first training kinematic measurements and a plurality of second training kinematic measurements at a training IMU of a training wearable computing device;
collecting a plurality of first ground-truth velocity measurements and a plurality of second ground-truth velocity measurements for the training wearable computing device;
training the first machine learning model on a first training data set including the plurality of first ground-truth velocity measurements paired with respective first training kinematic measurements of the plurality of first training kinematic measurements; and
training the second machine learning model on a second training data set including the plurality of second ground-truth velocity measurements paired with respective second training kinematic measurements of the plurality of second training kinematic measurements.

15. The method of claim 14, wherein the plurality of first ground-truth velocity measurements and the plurality of second ground-truth velocity measurements are collected using a global positioning system (GPS), visual simultaneous localization and mapping (SLAM), GPS-inertial odometry, or visual-inertial odometry.

16. The method of claim 11, wherein:
the one or more machine learning models include a unified machine learning model at which the current velocity estimate and the prior velocity estimate are computed; and
the method further comprises:
collecting a plurality of training kinematic measurements at a training IMU of a training wearable computing device;
collecting a plurality of first ground-truth velocity measurements and a plurality of second ground-truth velocity measurements for the training wearable computing device; and
training the unified machine learning model on a unified training data set including the plurality of first ground-truth velocity measurements and the plurality of second ground-truth velocity measurements associated with respective training kinematic measurements of the plurality of training kinematic measurements.

17. The method of claim 11, wherein the prior timestep is located at a midpoint of the time window.

18. The method of claim 11, further comprising:
storing, in memory, a pose estimate buffer of a plurality of previously computed pose estimates; and
when computing the composite pose estimate:
retrieving, from the pose estimate buffer, a delayed pose estimate for the wearable computing device at the prior timestep, wherein the delayed pose estimate is a previously computed pose estimate of the plurality of previously computed pose estimates that was computed as a current pose estimate at the prior timestep; and
computing the composite pose estimate based on the current pose estimate, the prior pose estimate, and the delayed pose estimate.

19. The method of claim 11, wherein the wearable computing device is a head-mounted display device.

20. A computing device comprising:
an inertial measurement unit (IMU); and
a processor configured to:
receive, from the IMU, a plurality of kinematic measurements collected within a time window;
with a first machine learning model, based at least in part on the plurality of kinematic measurements, compute a current velocity estimate for the computing device at a current timestep within the time window; and
with a second machine learning model, at the current timestep, based at least in part on the plurality of kinematic measurements, recompute a prior velocity estimate for the computing device from a prior timestep that is prior to the current timestep within the time window, wherein the prior velocity estimate is recomputed based at least in part on one or more kinematic measurements of the plurality of kinematic measurements collected subsequently to the prior timestep;
at the current timestep, compute a current pose estimate for the computing device at the current timestep and a prior pose estimate for the computing device at the prior timestep based at least in part on the current velocity estimate and the prior velocity estimate, respectively;
at the current timestep, compute a composite pose estimate for the computing device at the current timestep based at least in part on the current pose estimate and the prior pose estimate; and
output the composite pose estimate to a target program.

* * * * *